US012607743B2

(12) United States Patent
Yokoyama

(10) Patent No.: US 12,607,743 B2
(45) Date of Patent: Apr. 21, 2026

(54) DEVICE, MEASURING DEVICE, DISTANCE MEASURING SYSTEM, AND METHOD

(71) Applicant: SONY SEMICONDUCTOR SOLUTIONS CORPORATION, Kanagawa (JP)

(72) Inventor: Kyoji Yokoyama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 440 days.

(21) Appl. No.: 17/632,747

(22) PCT Filed: Aug. 4, 2020

(86) PCT No.: PCT/JP2020/029740

§ 371 (c)(1),
(2) Date: Feb. 3, 2022

(87) PCT Pub. No.: WO2021/029262

PCT Pub. Date: Feb. 18, 2021

(65) Prior Publication Data

US 2022/0276379 A1 Sep. 1, 2022

(30) Foreign Application Priority Data

Aug. 13, 2019 (JP) ................................. 2019-148614

(51) Int. Cl.
*G01S 17/08* (2006.01)
*G01S 17/86* (2020.01)
(Continued)

(52) U.S. Cl.
CPC .............. *G01S 17/08* (2013.01); *G01S 17/86* (2020.01); *G06N 3/082* (2013.01); *G06V 20/35* (2022.01); *G06V 10/82* (2022.01)

(58) Field of Classification Search
CPC ........ G01S 17/08; G01S 17/86; G01S 17/931; G01S 7/4802; G01S 7/4865; G06N 3/082; G06N 20/10; G06N 3/08
(Continued)

(56) References Cited

U.S. PATENT DOCUMENTS 11,150,664 B2* 10/2021 Elluswamy ............ G06N 20/00
2015/0243017 A1 8/2015 Fujimoto et al.
(Continued)

FOREIGN PATENT DOCUMENTS

CN 108270970 A 7/2018
CN 108885701 A 11/2018
(Continued)

OTHER PUBLICATIONS

International Search Report and Written Opinion of PCT Application No. PCT/JP2020/029740, issued on Oct. 6, 2020, 09 pages of ISRWO.

*Primary Examiner* — Catherine T. Rastovski
*Assistant Examiner* — Joshua L Forristall
(74) *Attorney, Agent, or Firm* — CHIP LAW GROUP

(57) ABSTRACT

A device according to the present disclosure is provided. The device includes a model switching unit. The model switching unit switches a machine learning model used for recognizing information about a distance to a measurement object based on an output signal output from a light receiving element when the light receiving element receives light emitted from a light source and reflected by the measurement object.

9 Claims, 13 Drawing Sheets

(51) Int. Cl.
    *G06N 3/082*       (2023.01)
    *G06V 10/82*       (2022.01)
    *G06V 20/00*       (2022.01)

(58) Field of Classification Search
    USPC ........................................................ 702/150
    See application file for complete search history.

(56) References Cited

U.S. PATENT DOCUMENTS

| | | | |
|---|---|---|---|
| 2018/0136332 A1 | 5/2018 | Barfield et al. | |
| 2019/0197667 A1* | 6/2019 | Paluri ................... | G06V 10/774 |
| 2019/0230303 A1* | 7/2019 | Wang .................... | B60W 40/02 |
| 2019/0340775 A1* | 11/2019 | Lee ...................... | G05D 1/0212 |
| 2020/0158876 A1* | 5/2020 | Karadeniz ............. | G01S 7/4915 |

FOREIGN PATENT DOCUMENTS

| | | | |
|---|---|---|---|
| CN | 110060297 A | 7/2019 | |
| CN | 110494868 A | 11/2019 | |
| DE | 112018001596 T5 | 1/2020 | |
| EP | 2910971 A1 | 8/2015 | |
| EP | 3340130 A1 | 6/2018 | |
| JP | 2014-167702 A | 9/2014 | |
| JP | 2015-172934 A | 10/2015 | |
| JP | 2016-176750 A | 10/2016 | |
| JP | 2018-091760 A | 6/2018 | |
| JP | 2018-190045 A | 11/2018 | |
| JP | 2019125116 A | 7/2019 | |
| WO | 2018/198823 A1 | 11/2018 | |

\* cited by examiner

302  LIGHT RECEIVING UNIT

S1

310

S2  RECOGNIZE TIME BY USING MACHINE LEARNING MODEL

MACHINE LEARNING MODEL

M

S3  GENERATE DATA

6

5

1  MEASURING DEVICE

7  STORAGE DEVICE

2  LIGHT SOURCE

8  IMAGING DEVICE

4  CONTROL DEVICE

FIG.10

FREQUENCY

FIRST SHOT $t_1$ t

FREQUENCY

SECOND SHOT $t_2$ t

FREQUENCY

N-TH SHOT $t_N$ t

START

ACQUIRE RGB IMAGE ~S201

EXTRACT FEATURE AMOUNT ~S202

RECOGNIZE SCENE ~S203

DETERMINE DISTANCE MEASUREMENT POSITION ~S204

SELECT MACHINE LEARNING MODEL ~S205

NOTIFY MEASURING DEVICE ~S206

END

START

SWITCH MACHINE LEARNING MODEL ~S101

CONTROL LIGHT SOURCE TO EMIT LIGHT ~S102

MEASURE TIME ~S103

RECOGNIZE FROM MEASUREMENT RESULTS ~S104

GENERATE DATA ~S105

END

12111

12101

12100

12105

12102

12103

12112

12113

12104

12114

DEVICE, MEASURING DEVICE, DISTANCE MEASURING SYSTEM, AND METHOD

CROSS REFERENCE TO RELATED APPLICATIONS

This application is a U.S. National Phase of International Patent Application No. PCT/JP2020/029740 filed on Aug. 4, 2020, which claims priority benefit of Japanese Patent Application No. JP 2019-148614 filed in the Japan Patent Office on Aug. 13, 2019. Each of the above-referenced applications is hereby incorporated herein by reference in its entirety.

FIELD

The present disclosure relates to a device, a measuring device, a distance measuring system, and a method.

BACKGROUND

As one of distance measuring methods for measuring a distance to a measurement object using light, a distance measuring method called a direct time of flight (ToF) method is known. In the distance measurement processing by the direct ToF method, the distance to the measurement object is obtained on the basis of the time from the emission timing indicating the emission of light by a light source to the light reception timing at which the light reflected by the measurement object is received by a light receiving element.

More specifically, the time from the emission timing to the light reception timing at which the light is received by the light receiving element is measured, and time information indicating the measured time is stored in the memory. This measurement is executed a plurality of times, and a histogram is created on the basis of a plurality of pieces of time information which obtained by the plurality of times of measurement and are stored in the memory. The distance to the measurement object is obtained on the basis of the histogram.

CITATION LIST

Patent Literature

Patent Literature 1: JP 2016-176750 A

SUMMARY

Technical Problem

However, in the above-described conventional art, there is a problem that various processes are required to generate the histogram, determine the threshold of the histogram and detect the time information, and obtain the distance to the measurement object, and processing time is required. In addition, there is a problem that it takes time and effort to adjust parameters required for various processes. Furthermore, since the calculation accuracy of the distance depends on the memory amount of the memory that stores the time information, the number of classes (bins) of the histogram, and the like, there is a problem that it is difficult to improve the accuracy.

Therefore, the present disclosure proposes a device, a measuring device, a distance measuring system, and a method capable of reducing processing time and time and effort for parameter adjustment, and improving accuracy.

Solution to Problem

According to the present disclosure, a device is provided. The device includes a model switching unit. The model switching unit switches a machine learning model used for recognizing information about a distance to a measurement object based on an output signal output from a light receiving element when the light receiving element receives light emitted from a light source and reflected by the measurement object.

Advantageous Effects of Invention

According to the present disclosure, it is possible to reduce the processing time, and the time and effort for parameter adjustment and to improve the accuracy. Incidentally, the effects described here are not necessarily limited and may be any of the effects described in the present disclosure.

BRIEF DESCRIPTION OF DRAWINGS

FIG. 10 is a diagram for describing recognition of time information by a recognition unit.

DESCRIPTION OF EMBODIMENTS

Hereinafter, each embodiment of the present disclosure will be described in detail on the basis of the drawings. Incidentally, in each of the following embodiments, the same reference signs are given to the same portions, and duplicate description will be omitted.

(Distance Measuring Method Using Histogram)

Prior to the description of the embodiment of the present disclosure, a technique for performing distance measurement using a histogram will be described as one of distance measuring methods for easy understanding. As a distance measuring technique in this case, a direct time of flight (ToF) method is applied. The direct ToF method is a technique in which reflected light obtained when light emitted from a light source is reflected by a measurement object is received by a light receiving element, and distance measurement is performed on the basis of time of a difference between light emission timing and light reception timing.

Figures 1, 2:
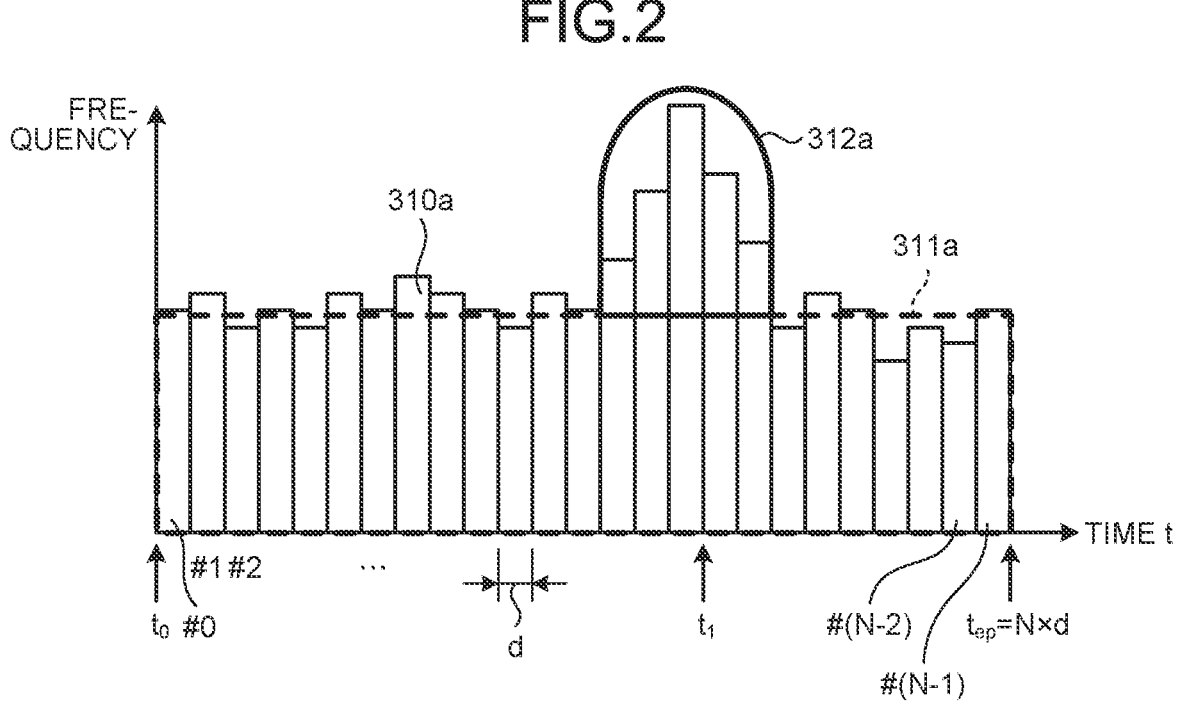
FIG. 1 is a diagram schematically illustrating an example of distance measurement by a direct ToF method.
FIG. 2 is a diagram illustrating an example of a histogram based on a time at which a light receiving unit receives light.

An example of a distance measuring method by the direct ToF method will be schematically described with reference to FIGS. 1 and 2. FIG. 1 is a diagram schematically illustrating an example of distance measurement by the direct ToF method. A distance measuring device 300a includes a light source unit 301a and a light receiving unit 302a. The light source unit 301a is, for example, a laser diode, and is driven to emit laser light in a pulse shape. The light emitted from the light source unit 301a is reflected by a measurement object 303a and received as reflected light by the light receiving unit 302a. The light receiving unit 302a includes a light receiving element that converts light into an electrical signal by photoelectric conversion, and outputs a signal corresponding to the received light.

Here, a time (light emission timing) at which the light source unit 301a emits light is defined as a time $t_{em}$, and a time (light reception timing) at which the light receiving unit 302a receives reflected light obtained when the light emitted from the light source unit 301a is reflected by the measurement object 303a is defined as a time $t_{re}$. Assuming that a constant c is a light velocity ($2.9979 \times 10^8$ [m/sec]), a distance D between the distance measuring device 300a and the measurement object 303a is calculated by following equation (1).

$$D = (c/2) \times (t_{em} - t_{re}) \qquad (1)$$

The distance measuring device 300a repeatedly executes the above-described processing a plurality of times. The light receiving unit 302a may include a plurality of light receiving elements, and the distance D may be calculated on the basis of each light reception timing at which the reflected light is received by each light receiving element. The distance measuring device 300a classifies a time $t_m$ (referred to as a light reception time $t_m$) from the time $t_{em}$ of the light emission timing to the light reception timing at which the light is received by the light receiving unit 302a on the basis of a class (bins) and generates a histogram.

Incidentally, the light received by the light receiving unit 302a during the light reception time $t_m$ is not limited to the reflected light obtained when the light emitted by the light source unit 301a is reflected by the measurement object 303a. For example, ambient light around the distance measuring device 300a (light receiving unit 302a) is also received by the light receiving unit 302a.

FIG. 2 is a diagram illustrating an example of a histogram based on the time at which the light receiving unit 302a receives light. In FIG. 2, a horizontal axis indicates a bin, and a vertical axis indicates a frequency for each bin. The bin is obtained by classifying the light reception time $t_m$ for each predetermined unit time d. Specifically, bin #0 is $0 \leq t_m < d$, bin #1 is $d \leq t_m < 2 \times d$, bin #2 is $2 \times d \leq t_m < 3 \times d$, . . . , bin #(N−2) is $(N-2) \times d \leq t_m < (N-1) \times d$. In a case where the exposure time of the light receiving unit 302a is time $t_{ep}$, $t_{ep} = N \times d$.

The distance measuring device 300a counts the number of times of acquiring the light reception time $t_m$ on the basis of the bin, obtains a frequency 310a for each bin, and generates a histogram. Here, the light receiving unit 302a also receives light other than the reflected light obtained by reflecting the light emitted from the light source unit 301a. Examples of such light other than the target reflected light include the above-described ambient light. A portion indicated by a range 311a in the histogram includes an ambient light component due to the ambient light. The ambient light is light randomly incident on the light receiving unit 302a, and becomes noise with respect to target reflected light.

On the other hand, the target reflected light is light received according to a specific distance, and appears as an active light component 312a in the histogram. A bin corresponding to the frequency of the peak in the active light component 312a is a bin corresponding to the distance D of the measurement object 303a. By acquiring the representative time (for example, the time at the center of the bin) of the bin as the above-described time $t_{re}$, the distance measuring device 300a can calculate the distance D to the measurement object 303a according to the above-described equation (1). In this way, by using a plurality of light reception results, appropriate distance measurement can be executed for random noise.

However, in the distance measuring method using the histogram described above, it is necessary to acquire the plurality of light reception results before detecting the time $t_{re}$ which is the light reception timing, and it takes time to perform a detection process of the light reception timing. Further, in order to generate the histogram, a memory for storing the light reception time $t_m$ is required, and the circuit scale of the device becomes large. Further, in order to appropriately detect the time $t_{re}$ from the histogram, it is necessary to set an appropriate threshold for each generated histogram, and a filtering process and threshold setting processing therefor are required, so that a processing load increases. Further, depending on the required distance accuracy, a filter coefficient that can reliably remove noise and a threshold for appropriately detecting the time $t_{re}$ are required, and thus the number of development steps for setting these values also increases.

As described above, the distance measuring method using the histogram is desired to be improved from the viewpoint of processing time, processing load, or memory reduction. In this regard, in the technique of the present disclosure, the distance from the light reception timing (time $t_{re}$) of the light receiving unit to the measurement object is recognized using a machine learning model without generating the histogram. An outline of the technique will be described below with reference to FIG. 3.

Embodiment

[Outline of Distance Measuring Method]

Figure 3:
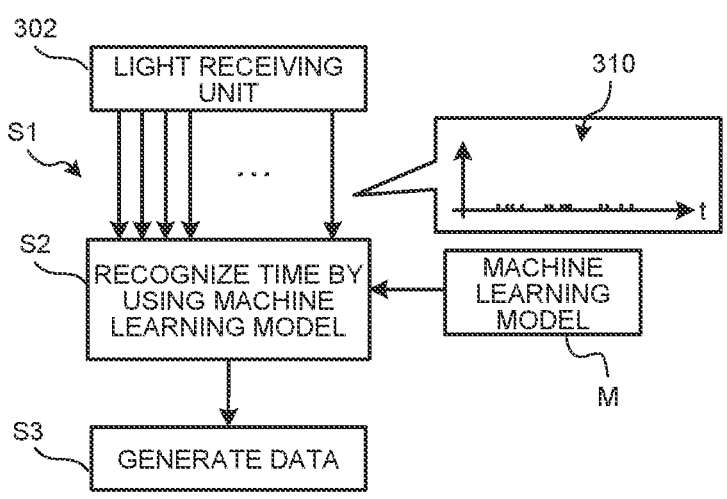
FIG. 3 is a diagram for describing an outline of a distance measuring method according to an embodiment of the present disclosure.

FIG. 3 is a diagram for describing an outline of a distance measuring method according to an embodiment of the present disclosure. The distance measuring method illustrated in FIG. 3 is executed by a measuring device 1 (not illustrated in FIG. 3). Further, the measuring device 1 includes a light receiving unit 302 having a plurality of pixels (light receiving elements).

As illustrated in FIG. 3, the light receiving unit 302 of the measuring device 1 outputs each light reception timing at which the reflected light from the measurement object is received for each light receiving element (step S1). The measuring device 1 recognizes the time $t_{re}$ corresponding to the distance to the measurement object by using the machine learning model on the basis of the distribution 310 of the light reception timings (step S2). Specifically, the measuring device 1 learns a machine learning model M in advance by using the distribution of the light reception timings by the plurality of light receiving elements as input data and the time $t_{re}$ corresponding to the distance to the measurement object as correct answer data. The measuring device 1 inputs, to the machine learning model M, the light reception timing output by the light receiving unit 302 in step S1 as input data, and acquires the output result of the machine learning model M as the time $t_{re}$ corresponding to the distance to the measurement object.

The measuring device 1 generates data including the distance from the acquired time $t_{re}$ to the measurement object (step S3).

As described above, the measuring device 1 recognizes the time $t_{re}$ corresponding to the distance to the measurement object by using the machine learning model to which the light reception timing is input, so that the measuring device 1 does not need to generate the histogram, and the time for measuring the distance can be shortened. Further, the processing necessary for generating the histogram becomes unnecessary, and the measuring device 1 can reduce the processing load for measuring the distance. Further, a memory for generating the histogram is unnecessary, and the circuit scale of the measuring device 1 can be reduced.

<Configuration of Distance Measuring System>

Figure 4:
FIG. 4 is a block diagram illustrating an example of a configuration of a distance measuring system according to the embodiment of the present disclosure.
Figure 4:
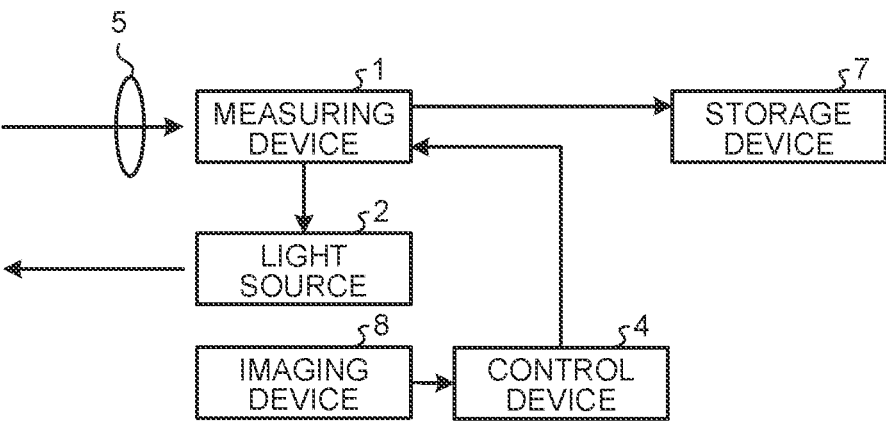

FIG. 4 is a block diagram illustrating an example of a configuration of a distance measuring system according to the embodiment of the present disclosure. A distance measuring system 6 illustrated in FIG. 4 includes the measuring device 1, a light source 2, a storage device 7, a control device 4, an optical system 5, and an imaging device 8.

The light source 2 is, for example, a laser diode, and is driven to emit laser light in a pulse shape. As the light source 2, a vertical cavity surface emitting laser (VCSEL) that emits laser light can be applied as a surface light source. The present disclosure is not limited to this, and a configuration may be applied in which an array in which laser diodes are arranged on a line is used as the light source 2, and laser light emitted from the laser diode array is scanned in a direction perpendicular to the line. Further, it is also possible to apply a configuration in which a laser diode as a single light source is used, and laser light emitted from the laser diode is scanned in horizontal and vertical directions.

The measuring device 1 includes a plurality of light receiving elements. The plurality of light receiving elements are arranged in, for example, a two-dimensional lattice shape to form a light receiving surface. The measuring device 1 recognizes the time $t_{re}$ corresponding to the distance to the measurement object by using the machine learning on the basis of the output signals of the plurality of light receiving elements, and generates distance data. The calculated distance data is stored in, for example, the storage device 7. The optical system 5 guides light incident from the outside to the light receiving surface included in the measuring device 1. Incidentally, hereinafter, a device including the light source 2 and the measuring device 1 is also referred to as a distance measuring device.

The imaging device 8 is, for example, an RGB camera that captures an RGB image of a subject space where a measurement object is present.

The control device 4 controls the entire operation of the distance measuring system 6. For example, the control device 4 supplies, to the measuring device 1, a light emission trigger signal which is a trigger for causing the light source 2 to emit light. The measuring device 1 causes the light source 2 to emit light at the timing based on the light emission trigger signal, and stores a time $t_{em}$ indicating the light emission timing. Further, the control device 4 sets a pattern at the time of distance measurement for the measuring device 1 in response to an instruction from the outside, for example.

The control device 4 controls switching of the machine learning model M used for machine learning by the measuring device 1 on the basis of the RGB image captured by the imaging device 8. The measuring device 1 selects the machine learning model M according to the type of the measurement object, for example, according to the control of the control device 4.

[Configuration of Measuring Device]

Figure 5:
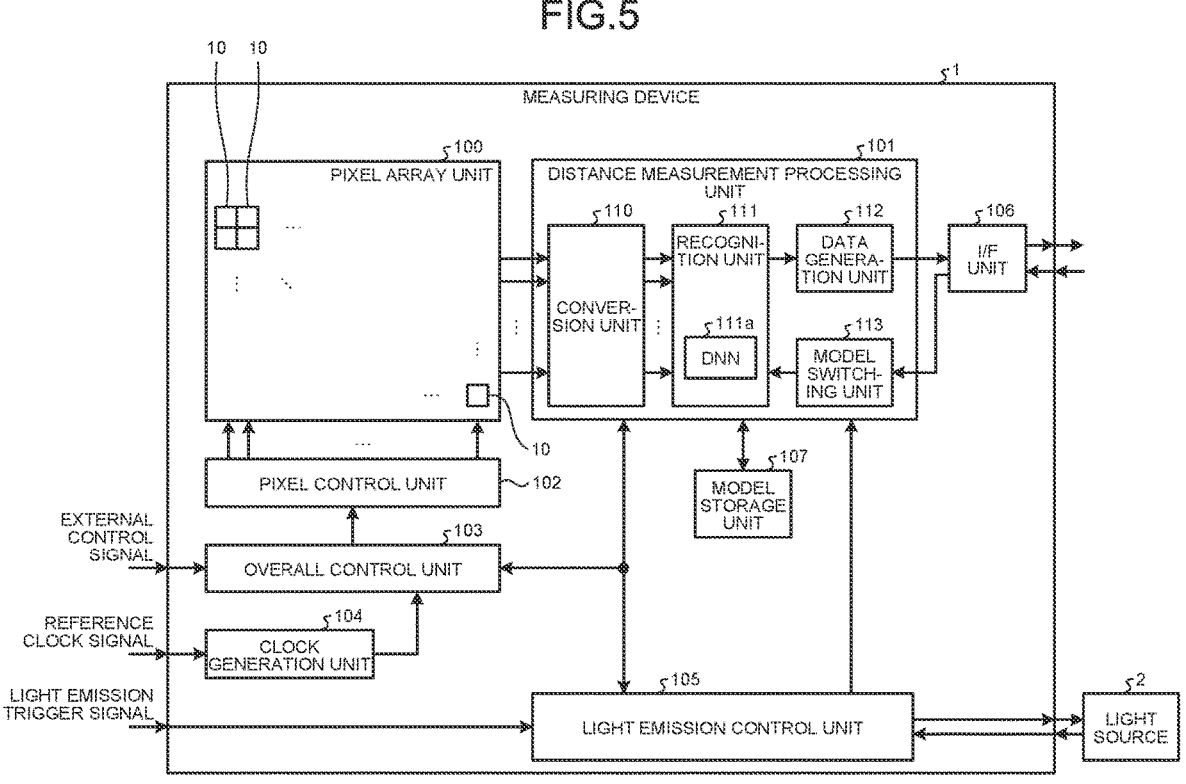
FIG. 5 is a block diagram illustrating an example of a configuration of a measuring device according to the embodiment of the present disclosure.

FIG. 5 is a block diagram illustrating an example of a configuration of the measuring device 1 according to the embodiment of the present disclosure. As illustrated in FIG. 5, the measuring device 1 includes a pixel array unit 100, a distance measurement processing unit 101, a pixel control unit 102, an overall control unit 103, a clock generation unit 104, a light emission control unit 105, an interface (I/F) unit 106, and a model storage unit 107.

The overall control unit 103 controls the overall operation of the measuring device 1 according to a program incorporated in advance, for example. Further, the overall control unit 103 can also execute control according to an external control signal supplied from the outside. The clock generation unit 104 generates one or more clock signals used in the measuring device 1 on the basis of a reference clock signal supplied from the outside. The light emission control unit 105 generates a light emission control signal indicating the light emission timing in accordance with a light emission trigger signal supplied from the outside. The light emission control signal is supplied to the light source 2 and also supplied to the distance measurement processing unit 101.

The pixel array unit 100 is a light receiving unit including a plurality of pixels 10, 10, and so on which are arranged in a two-dimensional lattice shape and include respective light receiving elements. The operation of each pixel 10 is controlled by the pixel control unit 102 according to an instruction of the overall control unit 103. For example, the pixel control unit 102 controls each pixel 10 so that the output signal of each pixel 10 is read out at one time. Further, the pixel 10 includes, for example, a single photon avalanche diode (SPAD) element as the light receiving element.

The distance measurement processing unit 101 measures the distance D to the measurement object on the basis of the output signal read from each pixel 10. The distance measurement processing unit 101 includes a conversion unit 110, a recognition unit 111, a data generation unit 112, and a model switching unit 113.

The conversion unit 110 converts the output signal supplied from the pixel array unit 100 into digital information. The output signal supplied from the pixel array unit 100 is output corresponding to the timing at which light is received by the light receiving element included in the pixel 10 corresponding to the pixel signal. The conversion unit 110 converts the supplied output signal into time information of a digital value indicating the timing. Output signals of all the pixels 10 of the pixel array unit 100 are input to the conversion unit 110. The conversion unit 110 converts all the output signals into time information and outputs the time information to the recognition unit 111.

The recognition unit 111 includes a deep neural network (DNN) 111a which is an example of the machine learning model. The DNN 111a is an algorithm having a multi-level structure modeled on a human cranial nerve circuit (neural network) designed by machine learning to recognize time information (hereinafter, also referred to as time information of the measurement object) corresponding to the distance D to the measurement object from time information (hereinafter, also referred to as time information of each pixel 10) corresponding to each output signal of all the pixels 10. Incidentally, the DNN 111a is an example, and the recognition unit 111 may use, as the machine learning model, a model (learning device) of an arbitrary format such as a regression model such as SVM.

The recognition unit 111 recognizes the time information of the measurement object by inputting the time information of each pixel 10 input from the conversion unit 110 to the DNN 111a and executing the DNN processing. Then, the recognition unit 111 outputs, to the data generation unit 112, the DNN result output from the DNN 111a as a recognition result.

The data generation unit 112 generates output data from the DNN result input from the recognition unit 111, and outputs the output data to the storage device 7. Specifically, the data generation unit 112 calculates the distance D to the measurement object on the basis of the time information of the measurement object recognized by the recognition unit 111, generates output data, and outputs the output data to the I/F unit 106.

The model switching unit 113 switches the machine learning model of the recognition unit 111. The model switching unit 113 reads the model stored in the model storage unit 107 on the basis of an instruction from the control device 4, for example, and supplies the model to the DNN 111a.

The output data generated by the data generation unit 112 is supplied to the I/F unit 106. The I/F unit 106 is, for example, a mobile industry processor interface (MIPI), and outputs the output data to, for example, the storage device 7. Alternatively, the I/F unit 106 may output the output data to the control device 4 or an external device (not illustrated).

(Laminated Structure of Measuring Device)

Figure 6:
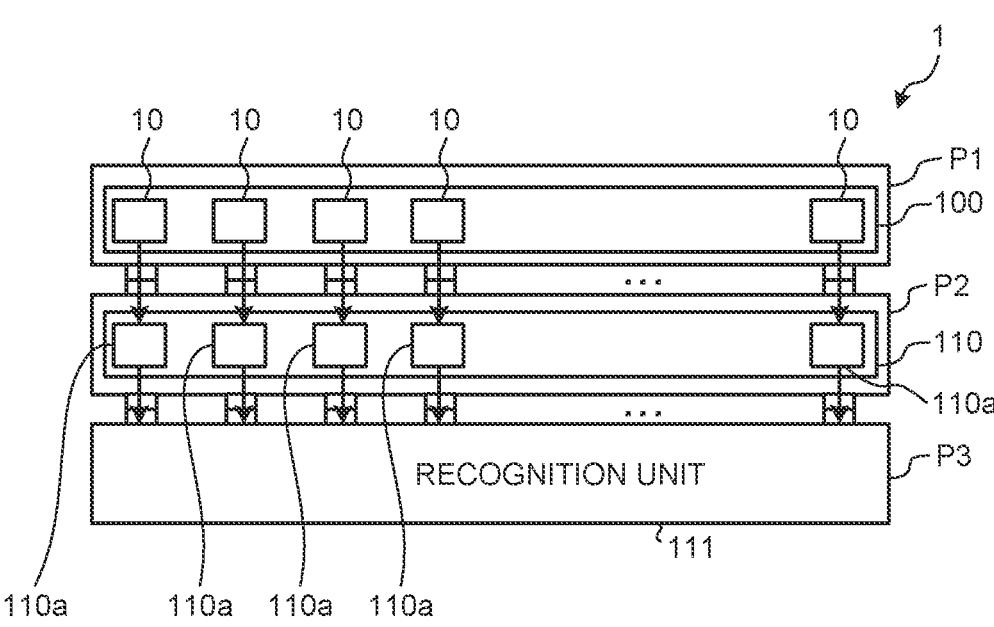
FIG. 6 is a schematic diagram illustrating an example of a laminated structure of the measuring device according to the embodiment of the present disclosure.

Here, the laminated structure of the measuring device 1 will be schematically described with reference to FIG. 6. FIG. 6 is a schematic diagram illustrating an example of a laminated structure of the measuring device 1 according to the embodiment of the present disclosure. As illustrated in FIG. 6, the measuring device 1 includes a first substrate P1 on which the pixel array unit 100 is arranged, a second substrate P2 on which the conversion unit 110 is arranged, and a third substrate P3 on which the recognition unit 111 is arranged.

As illustrated in FIG. 6, the pixel array unit 100 is arranged on the first substrate P1. Incidentally, the light receiving elements of the pixels 10 of the pixel array unit 100 may be arranged on the first substrate P1, and other circuit configurations included in the pixels 10 may be arranged on a substrate, such as the second substrate P2, other than the first substrate P1.

The conversion unit 110 is arranged on the second substrate P2. For example, in a case where the conversion unit 110 includes a time-to-digital conversion circuit 110a for each pixel 10, the time-to-digital conversion circuit corresponding to each pixel 10 is arranged on the second substrate P2.

Here, the time-to-digital conversion circuit (TDC) 110a measures a time when the output signal from the pixel 10 is supplied, and converts the measured time into time information based on a digital value. As described above, the TDC 110a is a circuit that generates one piece of time information for one pixel 10, and the conversion unit 110 has, for example, the same number of TDCs 110a as the number of pixels 10.

The TDC 110a includes, for example, a counter that counts a time from the emission timing at which the light source 2 emits light to the light reception timing at which the pixel 10 receives the light. The counter starts time measurement (count) in synchronization with the light emission control signal supplied from the light emission control unit 105. The counter ends the time measurement according to the inversion timing of the output signal supplied from the pixel 10. The TDC 110a outputs, to the recognition unit 111, time information obtained by converting the number of counts from the start to the end of time measurement by the counter into a digital value.

For bonding the first substrate P1 and the second substrate P2 illustrated in FIG. 6, for example, so-called Cu—Cu bonding for connecting copper electrodes formed on the bonding surfaces to each other is used. Alternatively, for bonding the first substrate P1 and the second substrate P2, for example, so-called direct bonding in which the bonding surfaces are flattened, and both are bonded by an electronic force, bump bonding, or the like may be used.

The recognition unit 111 is arranged on the third substrate P3. Incidentally, logic circuits, such as the data generation unit 112 and the overall control unit 103, other than the recognition unit 111 may be arranged on the third substrate P3. Alternatively, logic circuits such as the data generation unit 112, the model switching unit 113, and the overall control unit 103 may be arranged on another substrate (not illustrated).

The time information is supplied from all the TDCs 110a to the recognition unit 111 arranged on the third substrate P3. The recognition unit 111 recognizes the time information of the measurement object by recognizing the time information of each pixel 10 supplied from all the TDCs 110a as an input with the machine learning model.

For bonding the second substrate P2 and the third substrate P3 illustrated in FIG. 6, for example, so-called Cu—Cu bonding for connecting copper electrodes formed on the bonding surfaces to each other is used. Alternatively, for bonding the second substrate P2 and the third substrate P3, for example, so-called direct bonding in which the respective bonding surfaces are flattened, and both are bonded by an electronic force, bump bonding, or the like may be used.

As described above, in the embodiment of the present disclosure, the pixel array unit 100, the conversion unit 110, and the recognition unit 111 are arranged on different substrates (the first to third substrates P1 to P3), and the measuring device 1 measures the light reception times of all the pixels 10 at once. As a result, the recognition unit 111 can recognize the time information of the measurement object on the basis of the output signals of all the pixels 10. Therefore, the measuring device 1 can detect the distance D to the measurement object without generating a histogram, and processing and memory for generating a histogram are unnecessary.

Incidentally, here, an example in which the pixel array unit 100, the conversion unit 110, and the recognition unit 111 are arranged on different substrates (first to third substrates P1 to P3) has been described, but the present disclosure is not limited thereto. For example, the pixel array unit 100, the conversion unit 110, and the recognition unit 111 may be arranged on one substrate.

Here, a case where the output signals of all the pixels 10 are read at one time has been described as an example, but the method of reading the pixels 10 is not limited thereto. For example, the output signal may be read for each pixel 10 in a predetermined area. Alternatively, for example, the output signal may be read out for each pixel 10, row, or column. In this case, a memory for storing an output signal (or time information obtained by converting the output signal into time) read for each pixel 10 by the measuring device 1 may be included.

(Machine Learning Model)

Next, the machine learning model used by the recognition unit 111 to recognize the distance D will be described with reference to FIGS. 7 to 9. As described above, the time information corresponding to the output signals of all the pixels 10 is input to the recognition unit 111. The recognition unit 111 recognizes the time information of the measurement object by inputting the time information of each pixel 10 to the DNN 11a and executing the DNN processing.

An example of a neural network of the machine learning model will be described with reference to FIG. 7. FIG. 7 is a diagram for describing an outline of the neural network.

Figure 7:
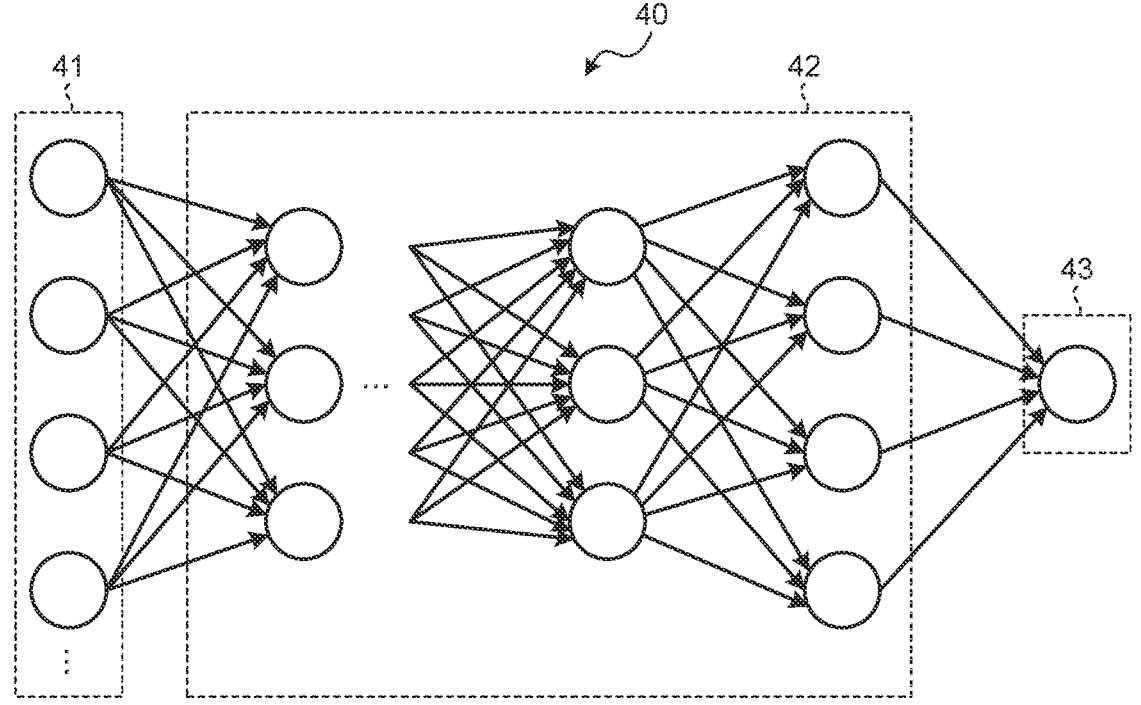
FIG. 7 is a diagram for describing an outline of a neural network.

As illustrated in FIG. 7, a neural network 40 includes three types of layers of an input layer 41, an intermediate layer 42, and an output layer 43, and has a network structure in which nodes included in each layer are connected by links. A circle in FIG. 7 corresponds to a node, and an arrow corresponds to a link. When input data is input to the input layer 41, calculation at the node and weighting at the link are performed in the order from the input layer 41 to the intermediate layer 42 and from the intermediate layer 42 to the output layer 43, and output data is output from the output layer 43. Incidentally, among neural networks, a neural network having a predetermined number or more of layers is also referred to as deep neural network (DNN) or deep learning.

The neural network 40 illustrated in FIG. 7 is merely an example, and may have any network configuration as long as a desired function can be realized. For example, in the example of FIG. 7, a case where the number of nodes of the output layer 43 is one is illustrated in order to simplify the description, but for example, in the case of a classification model, the number of nodes of the output layer 43 may be plural (for example, the number of classes to be classified).

Incidentally, it is known that the neural network can approximate an arbitrary function. The neural network can learn a network structure suitable for teacher data by using a calculation method such as back propagation. Therefore, by configuring the model by the neural network, the model is released from the restriction of the expression ability that the model is designed within a range that can be understood by a person.

Incidentally, the machine learning model used by the recognition unit 111 to recognize the time information is not limited to the DNN 111a, and may be configured by various networks. For example, the machine learning model may be a model (learning device) of an arbitrary format such as a regression model such as a support vector machine (SVM). For example, the machine learning model may be various regression models such as a nonlinear regression model and a linear regression model.

The machine learning model used by the recognition unit 111 to recognize the time information is switched according to the type of the measurement object. This point will be described with reference to FIGS. 8 and 9. FIGS. 8 and 9 are diagrams for describing examples of the machine learning model.

The light emitted from the light source 2 is reflected by the measurement object and received by the measuring device 1. At this time, the amount of reflected light reaching the measuring device 1 varies depending on the type of the measurement object.

Figure 8:
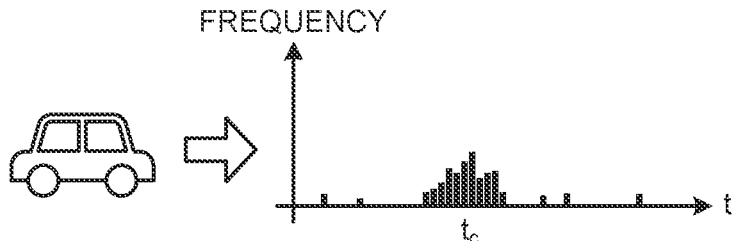
FIG. 8 is a diagram for describing an example of a machine learning model.

As illustrated in FIG. 8, in a case where the measurement object is a car, most of the irradiation light is reflected by, for example, a body portion formed as a flat surface and received by the measuring device 1. Therefore, the number of pixels 10 that receive the reflected light in the vicinity of a light reception timing $t_c$ corresponding to the distance to the measurement object is larger than the number of pixels 10 that receive the ambient light.

Therefore, as illustrated in the graph of FIG. 8, the distribution of the light reception timing becomes a distribution in which the number of pixels receiving the reflected light increases in a predetermined range including the light reception timing $t_c$. Incidentally, in the graph illustrated in FIG. 8, a vertical axis represents the frequency for each bin, a horizontal axis represents the bin (time t), and the relationship between the light reception timing of each pixel and the number of pixels is illustrated. In other words, the graph illustrated in FIG. 8 is a graph illustrating the time when the number of pixels receiving the reflected light is large.

Figure 9:
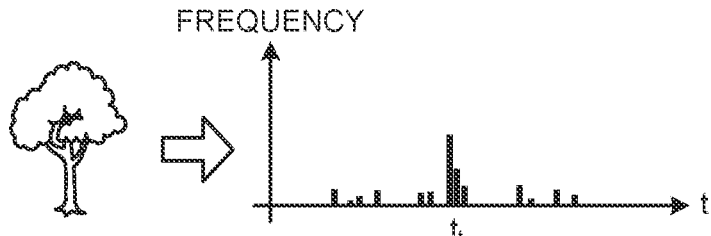
FIG. 9 is a diagram for describing an example of the machine learning model.

On the other hand, as illustrated in FIG. 9, in a case where the measurement object is a tree, a part of the irradiation light is irregularly reflected on the surface of the tree, and thus, the reflected light reaching the measuring device 1 is less than that in the case of a car. Therefore, as illustrated in FIG. 9, the distribution of the light reception timings increases in the vicinity of the light reception timing $t_t$ corresponding to the distance to the measurement object, but the number of pixels receiving the reflected light in the vicinity of the light reception timing $t_t$ decreases as compared with a case where the measurement object is a car.

As described above, the distribution of the light reception timings changes not only by the distance D to the measurement object but also by the type of the measurement object. In this regard, in the embodiment of the present disclosure, for example, the machine learning model is learned for each type of the measurement object such as a car, a building, a road, a pedestrian, or a tree. As a result, the recognition accuracy of the time information of the measurement object can be improved.

Incidentally, it is assumed that the machine learning model is constructed in advance on the basis of supervised learning as teacher data with the distribution of the light reception timing associated with the time information of the measurement object for each type of the measurement object. Further, it is assumed that the constructed machine learning model is stored in the model storage unit 107 in advance. The recognition unit 111 switches the machine learning model used for recognition of the time information by reading the machine learning model from the model storage unit 107 on the basis of an instruction from the model switching unit 113.

Incidentally, the construction of the machine learning model is not limited to each type of the measurement object described above. For example, the machine learning model may be constructed for each scene in the subject space. Specifically, for example, the machine learning model may be constructed for each time such as day or night, for each weather such as rainy weather or fine weather, or for each place such as a country, a region, an urban area, or a mountain area. Between day and night, for example, ambient light other than the reflected light received by each pixel 10 changes. Further, in the case of rainy weather, the light reception timing of the pixel 10 changes due to reflection by raindrops. Further, road conditions, signs, and surrounding environments vary depending on countries, regions, urban areas, and mountain areas. Therefore, by constructing the machine learning model for each scene in the subject space, the recognition accuracy of the time information of the measurement object in the subject space can be improved. Further, for example, in a case where the distance D to the car is recognized in an urban area in the daytime, the machine learning model may be constructed for each combination of the scene and the type of the measurement object.

(Distance Recognition by Machine Learning Model)

Figure 10:
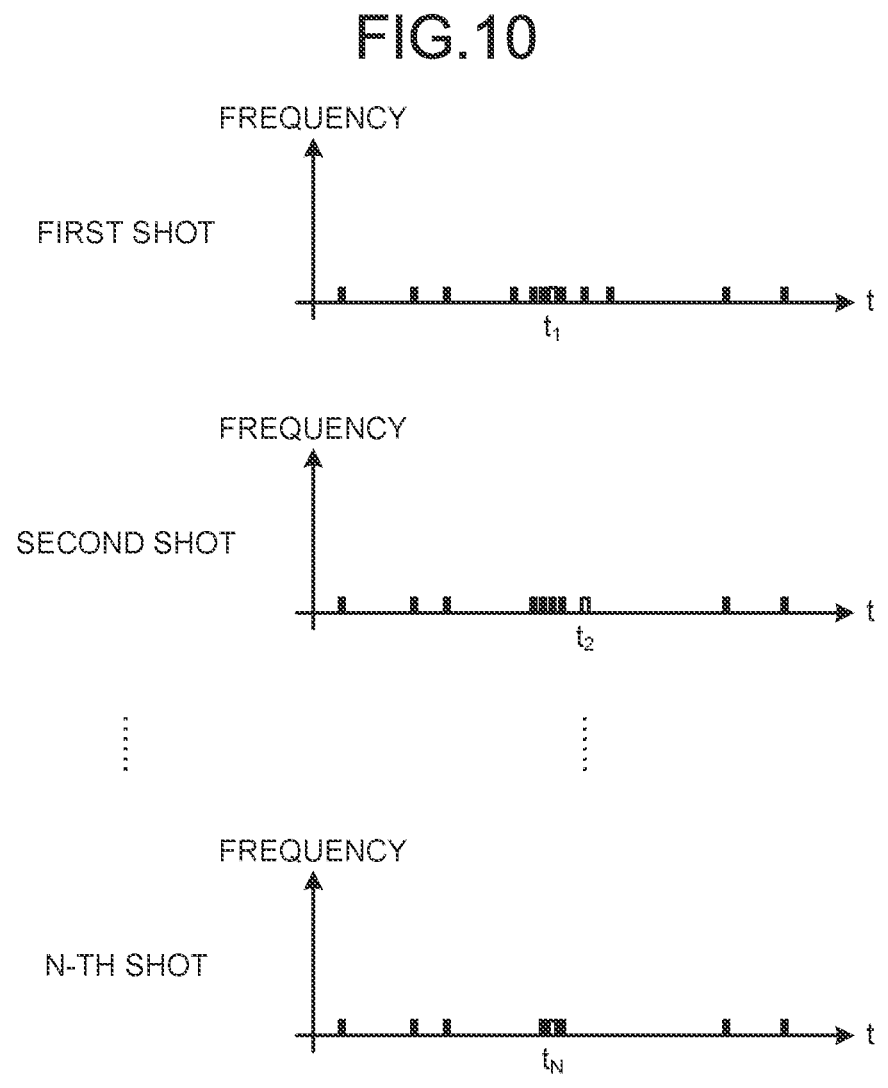

Next, the recognition of the time information of the measurement object by the recognition unit 111 will be described with reference to FIG. 10. FIG. 10 is a diagram for describing the recognition of the time information by the recognition unit 111. Hereinafter, the emission of irradiation light by the light source 2 is also referred to as a shot.

The recognition unit 111 acquires time information obtained by converting the output signal from the pixel array unit 100 by the conversion unit 110 for each shot, for example. The recognition unit 111 inputs the time information acquired for each shot to the DNN 111a, and acquires a recognition result of the time information corresponding to the distance D of the measurement object.

For example, as illustrated in FIG. 10, a case where the light source 2 emits irradiation light N times will be described as an example. At this time, the n-th irradiation by the light source 2 is referred to as an n-th shot (n=1 to N). The recognition unit 111 sequentially acquires the time information of the distribution as illustrated in FIG. 10 corresponding to the first to N-th shots by the light source 2.

When acquiring the time information of the pixel 10 for each of the first to N-th shots, the recognition unit 111 sequentially inputs the time information to the DNN 111a to recognize the time information of the measurement object. For example, in the example illustrated in FIG. 10, the recognition unit 111 acquires time information $t_1$ corresponding to the first shot as a recognition result by the DNN 11a, and outputs the time information $t_1$ to the data generation unit 112. Similarly, the recognition unit 111 acquires time $t_n$ (n=2 to N) corresponding to the n-th shot as the recognition result by the DNN 11a, and outputs the time $t_n$ to the data generation unit 112.

For example, when sequentially acquiring the time information $t_1$ to $t_N$ of the measurement object for the first to N-th shots from the recognition unit 111, the data generation unit 112 calculates the distance D to the measurement object corresponding to each shot on the basis of the above-described equation (1). Incidentally, the time information $t_1$ to $t_N$ output from the recognition unit 111 corresponds to the $t_{em}$–$t_{re}$ in the equation (1).

In this manner, the data generation unit 112 may calculate the distance D to the measurement object for each of the first to N-th shots, or the data generation unit 112 may calculate the distance D to the measurement object for each of a plurality of shots. At this time, the data generation unit 112 may calculate the distance D using the average value of the time information of the measurement object in the plurality of shots.

Alternatively, the data generation unit 112 may determine whether the value of the time information of the measurement object has converged, and calculate the distance D using the time information of the shot determined to have converged. Incidentally, in a case where the value of the time information converges, and the data generation unit 112 calculates the distance D, the data generation unit 112 may determine that the recognition by the recognition unit 111 has ended, and end the measurement of the distance of the measurement object.

Incidentally, although a case where the distance D is calculated on the basis of the light emitted by the light source 2 a plurality of times has been described here, for example, the measuring device 1 may end the measurement of the distance D with one shot. That is, the recognition unit 111 may perform the DNN processing on the time information of each pixel 10 acquired corresponding to one shot to recognize the time information of the measurement object, and when the data generation unit 112 calculates the distance D, the measurement of the distance D by the measuring device 1 may be ended. In this manner, when the distance D is calculated using the machine learning model, the measuring device 1 can measure the distance D with one shortest shot, and the measurement time of the distance D can be shortened.

[Control Device]

Figure 11:
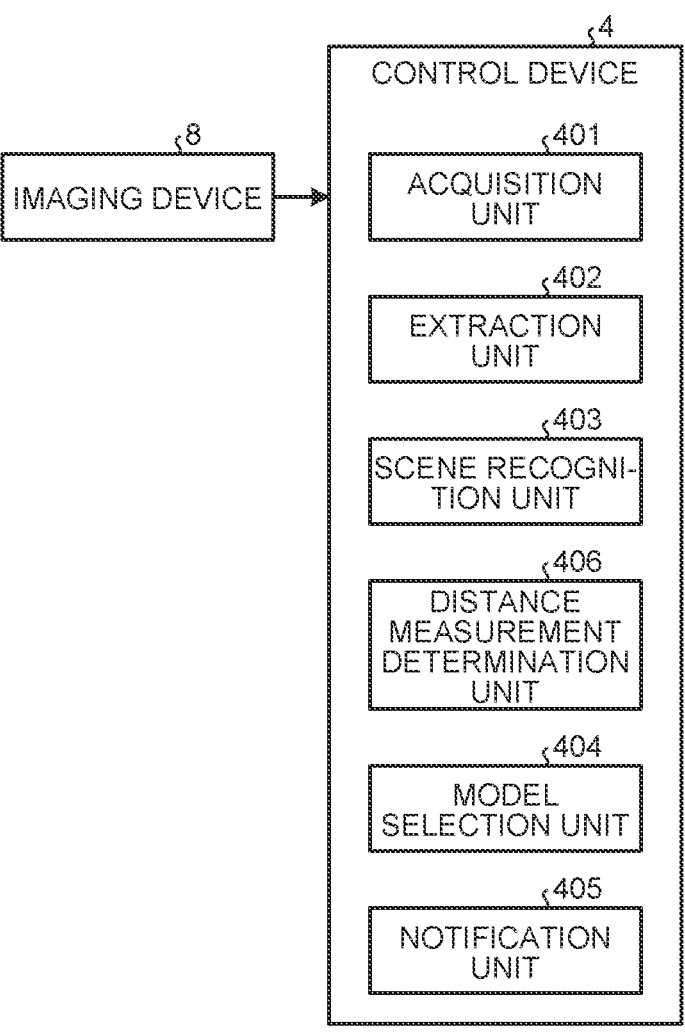
FIG. 11 is a block diagram illustrating a configuration example of a control device according to the embodiment of the present disclosure.

Next, the control device 4 will be described in detail with reference to FIG. 11. The control device 4 controls the distance measuring system and controls switching of the machine learning model by the model switching unit 113. Here, a point in which the control device 4 performs switching control of the machine learning model will be mainly described. Incidentally, FIG. 11 is a block diagram illustrating a configuration example of the control device 4 according to the embodiment of the present disclosure.

The control device 4 is realized by, for example, an electronic circuit such as a central processing unit (CPU) or a microprocessor. Further, the control device 4 may include a read only memory (ROM) that stores programs to be used, calculation parameters, and the like, and a random access memory (RAM) that temporarily stores parameters and the like that change appropriately.

The control device 4 detects the measurement object and recognizes the scene in the subject space on the basis of the captured image of the imaging device 8, and performs switching control of the machine learning model of the measuring device 1. Specifically, the control device 4 functions as an acquisition unit 401, an extraction unit 402, a scene recognition unit 403, a distance measurement determination unit 406, a model selection unit 404, and a notification unit 405.

The acquisition unit 401 acquires an RGB image from the imaging device 8. The acquisition unit 401 may acquire, for example, information regarding an imaging time, an imaging place, and the like of an RGB image. Such information may be acquired from the imaging device 8, or may be acquired from a sensor such as a GPS sensor (not illustrated). Such a sensor may be included in the distance measuring system 6 or may be an external sensor.

The extraction unit 402 extracts a measurement object from the RGB image. The extraction unit 402 performs image processing such as template matching, for example, and extracts the measurement object such as a tree, a vehicle, or a road from the RGB image. Further, the extraction unit 402 may extract, for example, a sky area, a ground area including a road, and the like from the color information of the RGB image. Alternatively, the extraction unit 402 may extract the measurement object, the sky area, the ground area, and the like using the machine learning model such as DNN.

The scene recognition unit 403 recognizes a scene in the subject space from the RGB image. Alternatively, the scene recognition unit 403 may recognize a scene from information regarding an imaging time, an imaging place, and the like of the RGB image. Further, the scene recognition unit 403 may acquire information necessary for scene recognition from an external device or the like via a network (not illustrated).

Here, the scene is, for example, information indicating a subject space represented by peripheral information such as season, time, weather, or place. In a case where the scene is recognized from the RGB image, the scene recognition unit 403 recognizes whether the subject space is daytime or nighttime from the brightness of the RGB image, for example. Further, the scene recognition unit 403 may recognize the scene on the basis of the extraction result by the extraction unit 402. For example, in a case where the extraction unit 402 detects a building, a pedestrian, a car, or the like as the measurement object, the scene recognition unit 403 recognizes that the subject space is an urban area.

Incidentally, the scene recognition by the scene recognition unit 403 is not limited to that based on the RGB image, and the scene may be recognized from information other than the RGB image. For example, the scene recognition unit 403 may recognize the season, time, and the like of the subject space from the imaging date and time of the RGB image. Further, the scene recognition unit 403 may recognize the place of the subject space from the imaging place of the RGB image. The scene recognition unit 403 may recognize the weather in the subject space on the basis of, for example, a detection result of a rain detection sensor and the RGB image. As described above, the scene recognition unit 403 may recognize the scene in the subject space on the basis of detection results of a plurality of sensors or the like. Alternatively, time information, weather, and the like can be acquired from an external device via a network.

Alternatively, the scene recognition unit 403 may recognize the scene in the subject space using the machine learning model such as DNN. In this case, the scene recognition unit 403 may input an RGB image to the DNN, and may input information such as the imaging date and time and the detection result of the rain detection sensor to the DNN in addition to the RGB image.

In this manner, the scene recognition unit 403 recognizes the scene in the subject space on the basis of the detection result of the sensor including the RGB image, for example. For example, the scene recognition unit 403 recognizes that the subject space is "in Japan", "urban area", "sunny", and "evening".

The distance measurement determination unit 406 determines a distance measurement position (distance measurement point) for measuring the distance D on the basis of the extraction result of the extraction unit 402 and the recognition result of the scene recognition unit 403. Further, the distance measurement determination unit 406 determines values of various parameters, such as a direction, power, and a pulse shape of irradiation by the light source 2, related to a light emitting system. Further, the distance measurement determination unit 406 selects values of various parameters, such as an exposure period and a frame rate of the pixel array unit 100, related to a light receiving system.

Figure 12:
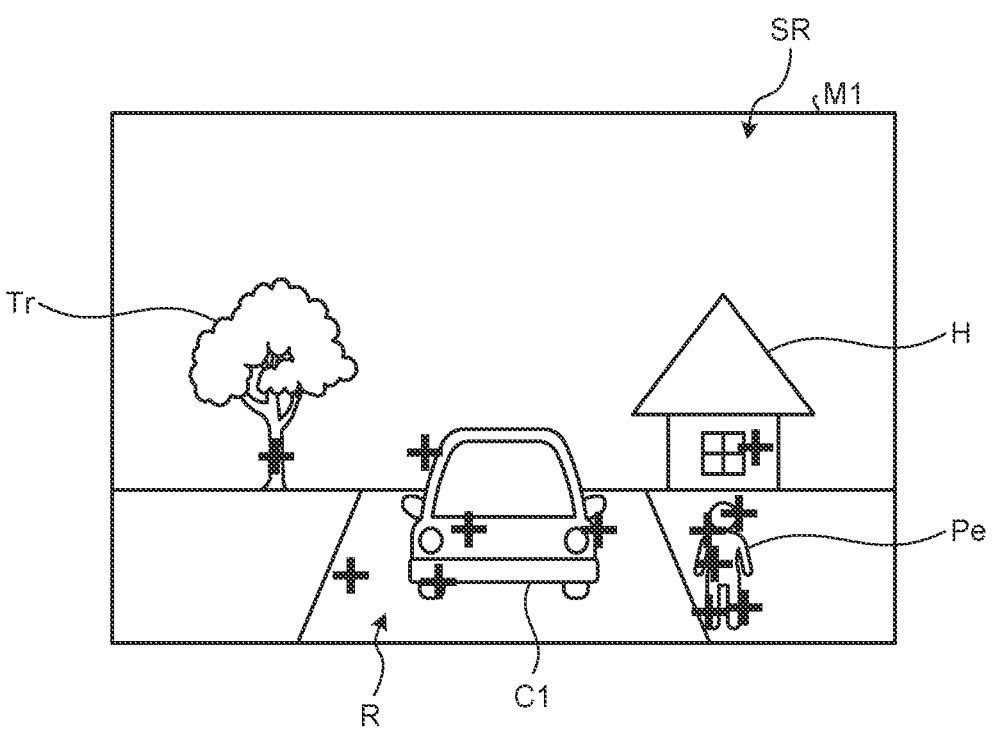
FIG. 12 is a diagram for describing a distance measurement position determined by a distance measurement determination unit.
Figure 13:
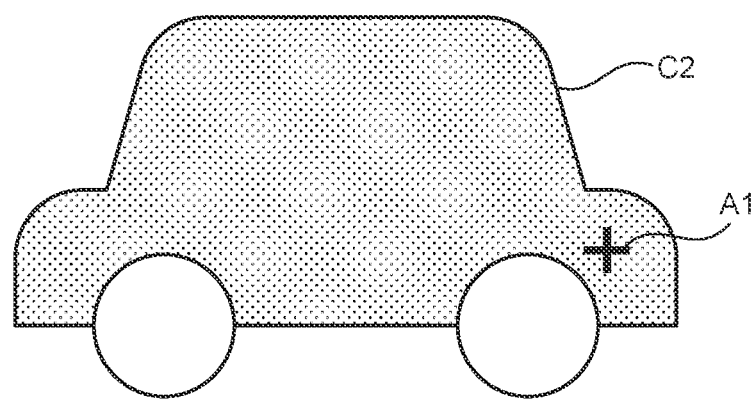
FIG. 13 is a diagram for describing a distance measurement position determined by the distance measurement determination unit.

Here, the distance measurement position (distance measurement point) determined by the distance measurement determination unit 406 will be described with reference to FIGS. 12 and 13. FIGS. 12 and 13 are diagrams for describing the distance measurement position determined by the distance measurement determination unit 406.

Incidentally, here, as illustrated in FIG. 12, it is assumed that the extraction unit 402 extracts a tree Tr, a road R, a car C1, a house H, a pedestrian Pe, and a sky area SR from an RGB image M1. At this time, on the basis of the extraction result of the extraction unit 402, the distance measurement determination unit 406 determines the measurement object to which the distance D is measured, the measurement object existing in the subject space. Further, the distance measurement determination unit 406 determines the position of the measurement object for which the distance D is measured.

Specifically, for example, the distance measurement determination unit 406 determines that the distance D to the pedestrian Pe is measured at five points indicated by "+" in FIG. 12. A number N1 of the distances D to be measured for each measurement object is determined in advance for each type of measurement object, for example, and the distance measurement determination unit 406 determines the distance measurement position in the RGB image M1, in other words, the direction of the light emitted from the light source 2 according to the number N1.

The distance measurement determination unit 406 sets the number of measurements N1 determined for each type of measurement object to be the largest in a case where the measurement object is a moving body such as the pedestrian Pe or the car C1, and sets the number of measurements N1 to be smaller than that in the case of the moving body in a case where the measurement object is a stationary body such as the tree Tr or the house H (see FIG. 12). Further, in a background such as the road R, the number of measurements N1 may be smaller than that of the stationary body. Further, it is not necessary to measure the distance D in an area without the measurement object such as the sky area SR. That is, since it is considered that there is no measurement object in the sky area SR, the light source 2 does not need to emit light toward the sky area SR. In this regard, the distance measurement determination unit 406 determines that the distance D to the measurement object is measured excluding the sky area SR.

In this manner, the distance measurement determination unit 406 determines the direction (distance measurement position) of the light emitted from the light source 2 on the basis of the type of the measurement object extracted by the extraction unit 402 and the position in the RGB image.

Alternatively, as illustrated in FIG. 13, for example, in a case where the extraction unit 402 extracts a car C2 facing sideways, the distance measurement determination unit 406 determines one position A1 as a measurement position for measuring the distance D to the car C2. This is because, in a case where the car C2 faces sideways, the side surface of the car C2 is substantially flat, and thus the distance D to the car C2 does not greatly change regardless of the measured position of the side surface. As described above, in a case where the measurement object has a flat surface, the distance measurement determination unit 406 determines the representative position of the flat surface as the distance measurement position. As a result, the distance measuring system 6 can reduce the number of times of measurement of the distance D to the measurement object by the measuring device 1.

Incidentally, here, the distance measurement determination unit 406 determines one representative position, but the present invention is not limited thereto. The distance measurement determination unit 406 may determine a plurality of representative positions.

The distance measurement determination unit 406 may determine the distance measurement position according to the scene by using the recognition result of the scene recognition unit 403. For example, in a case where the time zone of the subject space is "night", the distance measurement determination unit 406 may set the number of measurements N1 of the distance D to the measurement object to be larger than that in a case where the time zone is "day". That is, in a case where the time zone is "night", the distance measurement determination unit 406 may determine the measurement position such that the distance D to the measurement object is measured at more measurement positions than in the case of "day".

Returning to FIG. 11, the model selection unit 404 selects the machine learning model used by the measuring device 1 to recognize the distance D of the measurement object for each distance measurement position determined by the distance measurement determination unit 406, for example, on the basis of the extraction result of the extraction unit 402 and the recognition result of the scene recognition unit 403.

Specifically, for example, in a case where the extraction unit 402 extracts a pedestrian, the model selection unit 404 selects the machine learning model constructed by supervised learning with a pedestrian as correct answer data. In this manner, the model selection unit 404 selects the machine learning model according to the type of the measurement object extracted by the extraction unit 402, for example.

Alternatively, the model selection unit 404 may select the machine learning model according to the scene by using the recognition result of the scene recognition unit 403. For example, in a case where the weather in the subject space is "rain", the model selection unit 404 selects the machine learning model constructed on the basis of the measurement data collected in rainy weather, or the like. In this way, the model selection unit 404 selects the machine learning model suitable for the scene on the basis of the recognition result of the scene.

The model selection unit 404 may select the machine learning model on the basis of, for example, the extraction result of the extraction unit 402 and the recognition result of the scene recognition unit 403. For example, the machine learning model is associated with related keywords in advance, and the model selection unit 404 selects the machine learning model associated with the same keywords as the extraction result and the recognition result. Specifically, for example, in a case where the extraction result is "car" and the scene recognition result are "daytime" and "rain", the model selection unit 404 collates the extraction result and the scene recognition result with the keywords associated with a plurality of machine learning models, and selects the machine learning model having the highest degree of coincidence between the results and the keywords.

Alternatively, the model selection unit 404 may perform model selection using machine learning. In this case, the model selection unit 404 selects the machine learning model to be used for measurement of the distance D by inputting the extraction result and the scene recognition result to the DNN, which is an example of the machine learning model, and executing DNN processing.

The notification unit 405 notifies the measuring device 1 of the selection result of the model selection unit 404. The notification unit 405 notifies the measuring device 1 of information specifying the machine learning model selected by the model selection unit 404, for example. Further, in a case where the model selection unit 404 selects the light emitting system and the values of the parameters related to the light receiving system, the selected value of the parameter is notified to the measuring device 1 or the light source 2.

[Distance Measurement Processing Procedure]

Next, an example of a distance measurement processing procedure executed by the distance measuring system 6 will be described. First, a model selection process by the control device 4 will be described, and then a measurement processing procedure by the measuring device 1 will be described.

(Model Selection Process)

Figures 14, 15:
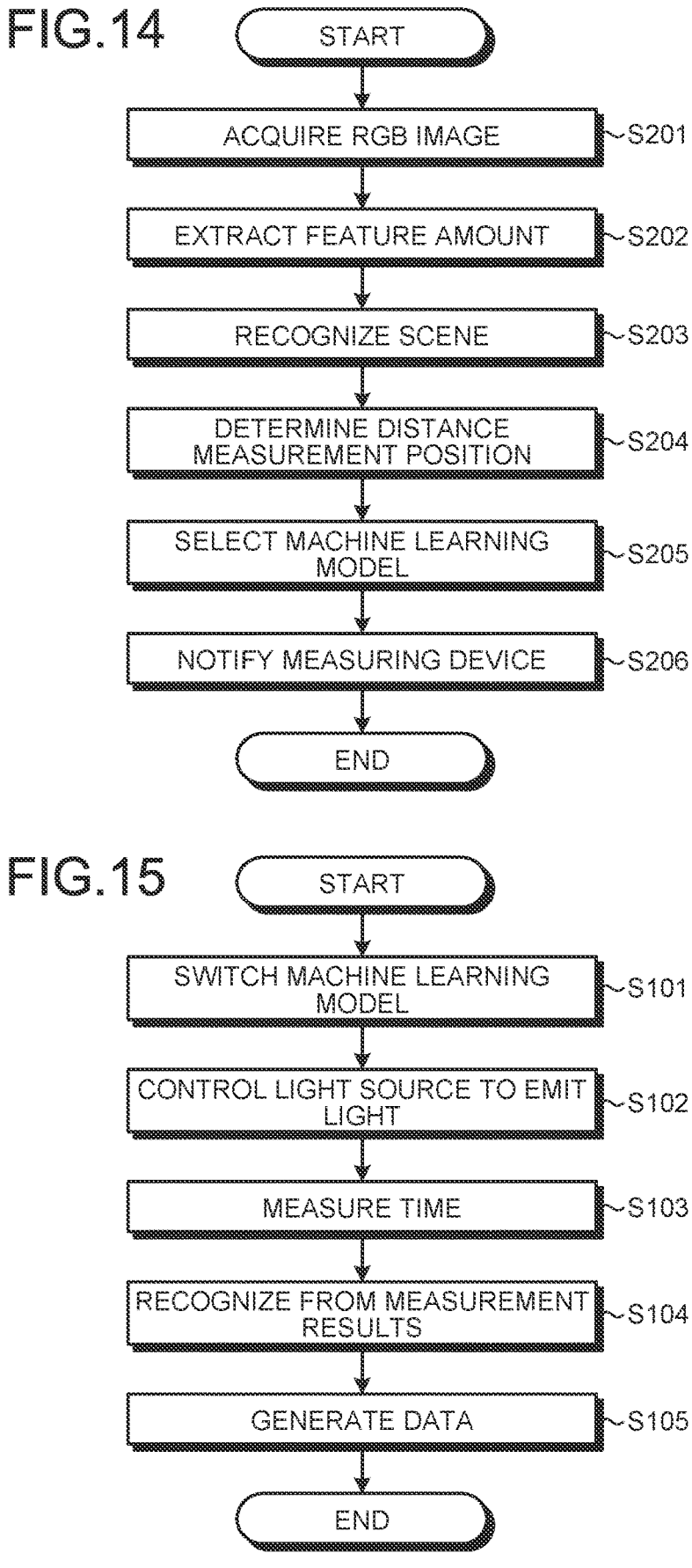
FIG. 14 is a flowchart illustrating an example of a procedure of a model selection process according to the embodiment of the present disclosure.
FIG. 15 is a flowchart illustrating an example of a procedure of a measurement process according to the embodiment of the present disclosure.

FIG. 14 is a flowchart illustrating an example of a procedure of the model selection process according to the embodiment of the present disclosure.

As illustrated in FIG. 14, the control device 4 acquires an RGB image from the imaging device 8 (step S201). Next, the control device 4 extracts a measurement object by extracting a feature amount from the RGB image (step S202).

Subsequently, the control device 4 recognizes a scene of the RGB image (step S203). The control device 4 determines a distance measurement position of the distance D of the measurement object on the basis of the measurement object extracted in step S202 and the scene recognized in step S203 (step S204).

The control device 4 selects the machine learning model for each distance measurement position (step S205), and notifies the measuring device 1 of the determined distance measurement position and the corresponding machine learning model (step S206).

(Measurement Process)

FIG. 15 is a flowchart illustrating an example of a procedure of a measurement process according to the embodiment of the present disclosure.

As illustrated in FIG. 15, the measuring device 1 first switches the machine learning model used for recognition by the recognition unit 111 on the basis of the notification from the control device 4 and the distance measurement position (step S101). Subsequently, the measuring device 1 controls the light source 2 to emit light (step S102).

In all the pixels 10, the measuring device 1 measures the time from when the light source 2 emits light to when the pixel 10 receives the light (step S103). The measuring device 1 recognizes time information of the measurement object from the measurement results of time in all the pixels 10 by using the machine learning model (step S104). The measuring device 1 generates data including the distance D to the measurement object on the basis of the recognized time information of the measurement object (step S105).

Hereinbefore, as described above, the device (the measuring device 1 or the control device 4) according to the embodiment of the present disclosure includes the model switching unit (the model switching unit 113 or the model selection unit 404). The model switching unit switches the machine learning model (the DNN 111*a*) used for recognizing the information about the distance D to the measurement object based on the output signal output from the light receiving element (the pixel 10) when the light emitted from the light source 2 and reflected by the measurement object is received.

As a result, the measuring device 1 can recognize the time information of the measurement object on the basis of the output signals of the plurality of light receiving elements, and can reduce the processing time required for measuring the distance D to the measurement object. Further, since the measuring device 1 does not generate a histogram and does not require a memory, it is possible to reduce the time and effort for parameter adjustment as compared with the measurement of the distance D using the histogram, and to improve accuracy.

[Modification]

Incidentally, in the above-described embodiment, the control device 4 selects the machine learning model on the basis of the RGB image, but the present disclosure is not limited thereto. For example, the measuring device 1 may select the machine learning model on the basis of the time information of all the pixels 10.

Figure 16:
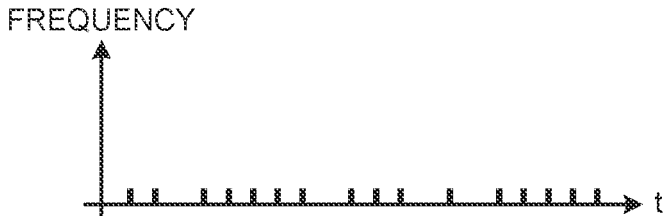
FIG. 16 is a diagram illustrating an example of distribution of time information of pixels.

For example, as illustrated in FIG. 16, it is assumed that the distribution of the time information of the pixels 10 is not dense but random in a specific area. In this case, the model switching unit 113 of the measuring device 1 selects the machine learning model according to such distribution, and switches the machine learning model to be used in the recognition of the recognition unit 111. For example, the model switching unit 113 may acquire the distribution of the time information of the pixels 10 from the conversion unit 110 or may acquire the distribution from the recognition unit 111. Incidentally, FIG. 16 is a diagram illustrating an example of the distribution of the time information of the pixels 10.

Alternatively, for example, the model switching unit 113 of the measuring device 1 may change the values of various parameters, such as the direction, power, and pulse shape of irradiation by the light source 2, related to the light emitting system on the basis of such distribution. For example, in a case where the time information of the pixels 10 has a random distribution as illustrated in FIG. 16, the model switching unit 113 changes the values of various parameters such that the irradiation power is increased when determining that the distance D to the measurement object is long or the irradiation direction is changed when determining that there is no measurement object in the irradiation direction. The model switching unit 113 outputs the changed parameter to, for example, the light emission control unit 105. Alternatively, the light emission control unit 105 may change various parameters on the basis of such distribution.

Figure 17:
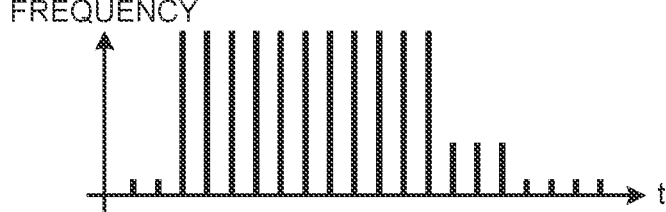
FIG. 17 is a diagram illustrating another example of the distribution of the time information of the pixels.

As illustrated in FIG. 17, it is assumed that the distribution of the time information of the pixels 10 is a distribution concentrated in a specific area. That is, in a case where the detection result of the light reception timing by the pixel 10 is a saturated distribution, the model switching unit 113 of the measuring device 1 selects the machine learning model according to such distribution, and switches the machine learning model used in the recognition of the recognition unit 111. Incidentally, FIG. 17 is a diagram illustrating another example of the distribution of the time information of the pixels 10.

Alternatively, for example, the model switching unit 113 of the measuring device 1 may change the values of various parameters, such as the direction, power, and pulse shape of irradiation by the light source 2, related to the light emitting system on the basis of such distribution. The model switching unit 113 outputs the changed parameter to, for example, the light emission control unit 105. Alternatively, the light emission control unit 105 may change various parameters on the basis of such distribution.

Incidentally, here, the measuring device 1 changes various parameters of the light emitting system. However, various parameters, such as light receiving sensitivity, of the light receiving system may be changed.

As described above, the measuring device 1 switches the machine learning model or changes various parameters of the light emitting system or the light receiving system on the basis of the time information of the pixel 10, whereby the measuring device 1 can improve the measurement accuracy of the distance D to the measurement object.

In the above-described embodiment, the recognition unit 111 of the measuring device 1 recognizes the time information of the measurement object, but the present disclosure is not limited thereto. The recognition unit 111 of the measuring device 1 may input the time information of each pixel 10 to the DNN 111*a* to recognize the distance D to the measurement object. In this manner, the recognition unit 111 recognizes information, such as the time information or the distance D of the measurement object, related to the distance D to the measurement object.

Incidentally, in the above-described embodiment, the control device 4 selects the machine learning model on the basis of the imaging result of the imaging device 8, but the machine learning model may be selected on the basis of the sensing result of another sensor device.

For example, the control device 4 may select the machine learning model on the basis of a sensing result of an infrared sensor such as a near-infrared light (IR) sensor, a short-wave infrared (SWIR) sensor, a mid-wave infrared (MWIR) sensor, or a long-wave infrared (LWIR) sensor instead of the imaging device 8. Alternatively, the control device 4 may select the machine learning model on the basis of a sensing result of a laser imaging detection and ranging (LIDAR) sensor for measuring the distance D on the basis of light in a frequency band different from the frequency band of the light emitted from the light source 2. Further, the control device 4 may select the machine learning model on the basis of a sensing result of a radio detecting and ranging (RADAR) sensor.

Alternatively, the control device 4 may select the machine learning model by combining the sensing results of various sensors including the imaging device 8 described above.

The recognition unit 111 may recognize the time information of the measurement object by using the sensing results of the various sensors described above. In this case, the outputs of the above-described various sensors are input to the recognition unit 111. The recognition unit 111 recognizes the time information of the measurement object by inputting the time information of each pixel 10 and the outputs of the various sensors described above to the DNN 111*a* and executing the DNN processing. As described above, by also using the outputs of the various sensors, the recognition accuracy of the time information of the measurement object by the recognition unit 111 can be improved.

Incidentally, in the above-described embodiment, the measuring device 1 switches the machine learning model to measure the distance D to the measurement object, but the present disclosure is not limited thereto. For example, in a case where one machine learning model can correspond to a plurality of types of measurement objects, the measuring device 1 may measure the distance D to the measurement object by using one machine learning model. Alternatively, even in a case where the measuring device 1 measures the distance D to a specific measurement object such as a car, the measuring device 1 may measure the distance D by using, for example, one machine learning model specialized for a car.

For example, in the embodiment, an example has been described in which the data generation unit 112 and the model switching unit 113 are provided inside the measuring device 1. However, the data generation unit 112 and the model switching unit 113 may be provided in an application processor provided outside the distance measuring device.

Alternatively, for example, in the embodiment, an example has been described in which the distance measurement determination unit 406 and the model selection unit 404 are provided inside the control device 4. However, the distance measurement determination unit 406 and the model selection unit 404 may be provided in the measuring device 1. In this case, the model selection unit 404 may be provided in the measuring device 1 by including the function of the model selection unit 404 in the model switching unit 113.

[Effects]

A device (measuring device 1 or control device 4) according to the embodiment and the modifications includes a model switching unit (model switching unit 113 or model selection unit 404) that switches a machine learning model (the DNN 111*a*) used for recognizing information about a distance D to a measurement object based on an output signal output from a light receiving element (the pixel 10) when the light receiving element receives light emitted from a light source 2 and reflected by the measurement object.

As a result, the device (the measuring device 1 or the control device 4) can measure the distance D to the measurement object without generating a histogram, and can reduce the processing time required for measuring the distance D.

In addition, the model switching unit (the model switching unit 113) according to the embodiment and the modifications switches the machine learning model based on the output signal.

As a result, the measuring device 1 can measure the distance D to the measurement object using an appropriate machine learning model according to the output signal of the pixel 10.

In addition, the model switching unit (the model switching unit 113 or the model selection unit 404) according to the embodiment and the modifications switches the machine learning model based on the sensing result of the subject space in which the measurement object exists.

As a result, the measuring device 1 can measure the distance D to the measurement object using an appropriate machine learning model corresponding to the measurement object existing in the subject space.

Furthermore, the sensing result includes information about the type of the measurement object, and the model switching unit (the model switching unit 113 or the model selection unit 404) according to the embodiment and the modifications switches the machine learning model based on the sensing result.

As a result, the measuring device 1 can measure the distance D to the measurement object using an appropriate machine learning model according to the type of the measurement object existing in the subject space.

Furthermore, the sensing result includes information about a scene in the subject space, and the model switching unit (the model switching unit 113 or the model selection unit 404) according to the embodiment and the modifications switches the machine learning model based on the sensing result.

As a result, the measuring device 1 can measure the distance D to the measurement object using an appropriate machine learning model according to the scene of the subject space.

Furthermore, the information about the scene includes at least one of information about a weather, information about a time, and information about a place of the subject space, and the model switching unit (the model switching unit 113 or the model selection unit 404) according to the embodiment and the modifications switches the machine learning model based on the information about the scene.

As a result, the measuring device 1 can measure the distance D to the measurement object using an appropriate machine learning model according to the scene of the subject space.

Furthermore, the device (the control device 4) according to the embodiment and the modifications further includes a determination unit (the distance measurement determination unit 406) that determines a distance measuring point (distance measurement position) in the subject space based on the sensing result.

As a result, the measuring device 1 can measure the distance D to the measurement object at an appropriate distance measuring point, and can reduce unnecessary distance measurement.

Furthermore, the measuring device 1 according to the embodiment and the modifications includes the light receiving unit (the pixel array unit 100) including a light receiving element (the pixel 10) that outputs a signal when the light receiving element receives light emitted from the light source 2 and reflected by the measurement object, the recognition unit 111 that recognizes information about the distance D to the measurement object using the machine learning model (the DNN 111*a*) based on the output signal of the light receiving unit, and the model switching unit 113 that switches the machine learning model.

As a result, the measuring device 1 can measure the distance D to the measurement object without generating a histogram, and can reduce the processing time required for measuring the distance D.

Furthermore, the distance measuring system 6 according to the embodiment and the modifications includes the light source 2 that irradiates the measurement object in the subject space with light, the sensor unit (the imaging device 8) that senses the subject space, the light receiving unit (the pixel array unit 100) including the light receiving element (the pixel 10) that outputs a signal when the light receiving element receives the light emitted from the light source 2 and reflected by the measurement object, the recognition unit 111 that recognizes the distance D to the measurement object using the machine learning model (the DNN 111*a*) based on the output signal of the light receiving unit, and the model switching unit (the model switching unit 113 or the model selection unit 404) that switches the machine learning model based on the sensing result by the sensor unit.

As a result, the distance measuring system 6 can measure the distance D to the measurement object without generating a histogram, and can reduce the processing time required for measuring the distance D.

[Application Examples of Technique According to Present Disclosure]

Figure 18:
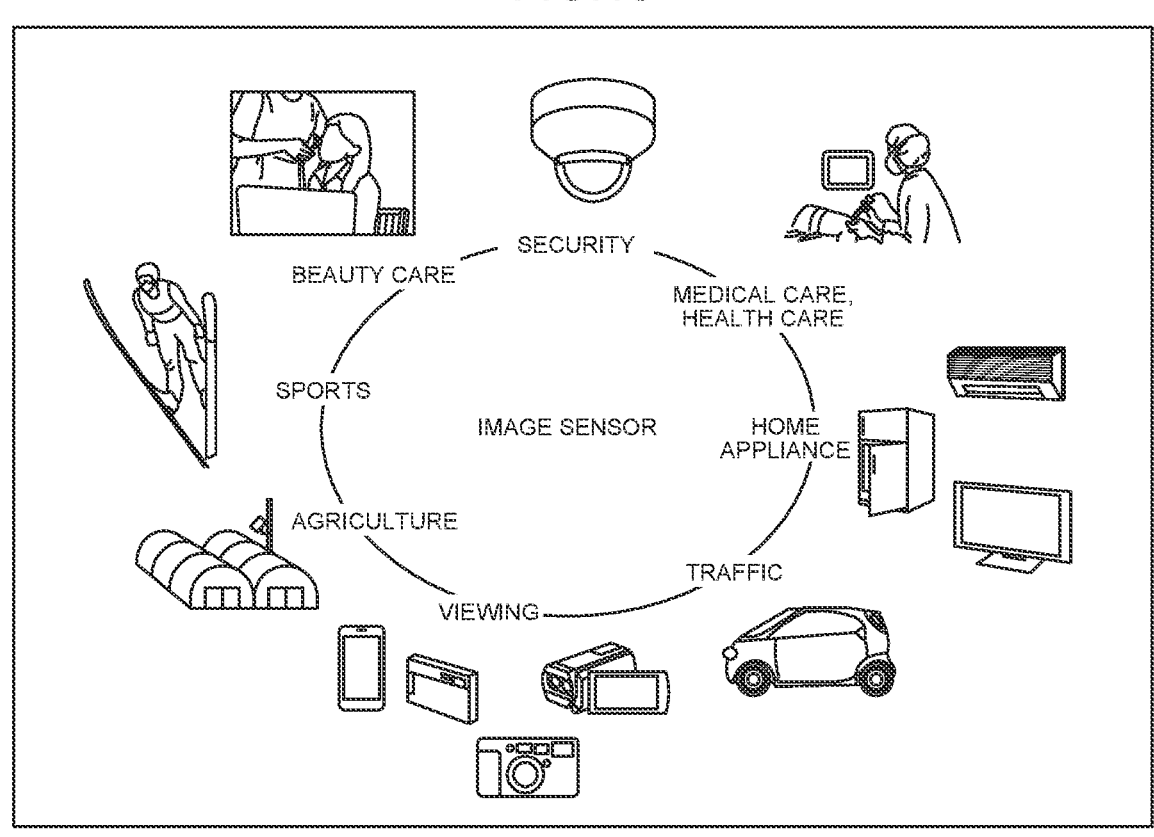
FIG. 18 is a diagram illustrating a usage example using a measuring device to which the above-described embodiment and modification can be applied.

Next, application examples of the embodiment and modification of the present disclosure will be described. FIG. 18 is a diagram illustrating a usage example using the measuring device 1 to which the above-described embodiment and modification can be applied.

The measuring device 1 described above can be used, for example, in various cases of sensing light such as visible light, infrared light, ultraviolet light, and X-rays as described below.

A device, such as a digital camera or a portable device with a camera function, which captures an image to be used for viewing.

A device, such as an in-vehicle sensor that captures images of the front, rear, surroundings, inside, and the like of an automobile, a monitoring camera that monitors traveling vehicles and roads, a distance measuring sensor that measures a distance between vehicles and the like, which is used for traffic to support safe driving such as automatic stop and recognition of the state of a driver.

A device used for home appliances such as a TV, a refrigerator, and an air conditioner in order to capture an image of a gesture of a user and operate the device according to the gesture.

A device, such as an endoscope or a device that performs angiography by receiving infrared light, which is used for medical care or health care.

A device, such as a monitoring camera for crime prevention or a camera for person authentication, which is used for security.

A device, such as a skin measuring instrument for photographing skin or a microscope for photographing a scalp, which is used for beauty care.

A device, such as an action camera or a wearable camera for sports or the like, which is used for sports.

A device, such as a camera for monitoring the state of fields and crops, which is used for agriculture.

(Application Example to Moving Body)

The technique (present technology) according to the present disclosure can be applied to various products. For example, the technique according to the present disclosure may be realized as a device mounted on any type of moving body such as an automobile, an electric automobile, a hybrid electric automobile, a motorcycle, a bicycle, a personal mobility, an airplane, a drone, a ship, and a robot.

Figure 19:
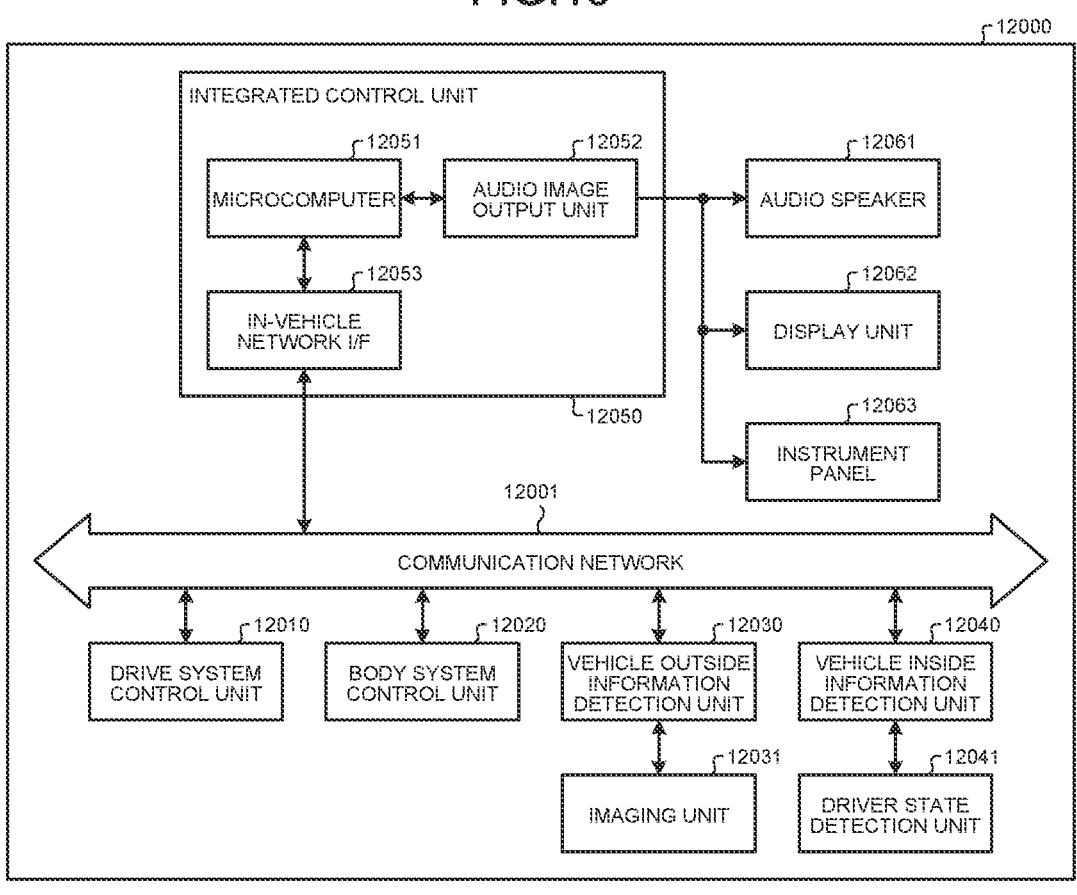
FIG. 19 is a block diagram illustrating a schematic configuration example of a vehicle control system, which is an example of a moving-body control system to which a technique according to the present disclosure can be applied.

FIG. 19 is a block diagram illustrating a schematic configuration example of a vehicle control system which is an example of a moving-body control system to which the technique according to the present disclosure can be applied.

A vehicle control system 12000 includes a plurality of electronic control units connected via a communication network 12001. In the example illustrated in FIG. 19, the vehicle control system 12000 includes a drive system control unit 12010, a body system control unit 12020, a vehicle outside information detection unit 12030, a vehicle inside information detection unit 12040, and an integrated control unit 12050. Further, as a functional configuration of the integrated control unit 12050, a microcomputer 12051, an audio image output unit 12052, and an in-vehicle network interface (I/F) 12053 are illustrated.

The drive system control unit 12010 controls the operation of devices related to the drive system of the vehicle according to various programs. For example, the drive system control unit 12010 functions as a control device of a driving force generation device, such as an internal combustion engine or a driving motor, for generating a driving force of the vehicle, a driving force transmission mechanism for transmitting the driving force to wheels, a steering mechanism for adjusting a steering angle of the vehicle, a braking device for generating a braking force of the vehicle, and the like.

The body system control unit 12020 controls operations of various devices mounted on a vehicle body according to various programs. For example, the body system control unit 12020 functions as a control device of a keyless entry system, a smart key system, a power window device, or various lamps such as a head lamp, a back lamp, a brake lamp, a blinker, or a fog lamp. In this case, radio waves transmitted from a portable device that substitutes for a key or signals of various switches can be input to the body system control unit 12020. The body system control unit 12020 receives input of these radio waves or signals, and controls a door lock device, a power window device, a lamp, and the like of the vehicle.

The vehicle outside information detection unit 12030 detects the outside information of the vehicle on which the vehicle control system 12000 is mounted. For example, an imaging unit 12031 is connected to the vehicle outside information detection unit 12030. The vehicle outside information detection unit 12030 causes the imaging unit 12031 to capture an image of the outside of the vehicle, and receives the captured image. The vehicle outside information detection unit 12030 may perform an object detection process or a distance detection process of a person, a car, an obstacle, a sign, a character on a road surface, or the like on the basis of the received image.

The imaging unit 12031 is an optical sensor that receives light and outputs an electrical signal corresponding to the amount of received light. The imaging unit 12031 can output the electrical signal as an image or can output the electrical signal as distance measurement information. Further, the light received by the imaging unit 12031 may be visible light or invisible light such as infrared rays.

The vehicle inside information detection unit 12040 detects the inside information of the vehicle. For example, a driver state detection unit 12041 that detects the state of the driver is connected to the vehicle inside information detection unit 12040. The driver state detection unit 12041 includes, for example, a camera that images the driver, and the vehicle inside information detection unit 12040 may calculate the degree of fatigue or the degree of concentration of the driver or may determine whether or not the driver is dozing off on the basis of the detection information input from the driver state detection unit 12041.

The microcomputer 12051 can calculate a control target value of the driving force generation device, the steering mechanism, or the braking device on the basis of the vehicle inside/outside information acquired by the vehicle outside information detection unit 12030 or the vehicle inside information detection unit 12040, and output a control command to the drive system control unit 12010. For example, the microcomputer 12051 can perform cooperative control for the purpose of implementing functions of an advanced driver assistance system (ADAS) including collision avoidance or impact mitigation of the vehicle, follow-up traveling based on an inter-vehicle distance, vehicle speed maintenance traveling, vehicle collision warning, vehicle lane departure warning, or the like.

The microcomputer 12051 controls the driving force generation device, the steering mechanism, the braking device, or the like on the basis of the surrounding information of the vehicle acquired by the vehicle outside information detection unit 12030 or the vehicle inside information detection unit 12040, thereby performing cooperative control for the purpose of automatic driving or the like in which the vehicle autonomously travels without depending on the operation of the driver.

The microcomputer 12051 can output a control command to the body system control unit 12020 on the basis of the vehicle outside information acquired by the vehicle outside information detection unit 12030. For example, the microcomputer 12051 can perform cooperative control for the purpose of antiglare such as switching from a high beam to a low beam by controlling the headlamp according to the position of a preceding vehicle or an oncoming vehicle detected by the vehicle outside information detection unit 12030.

The audio image output unit 12052 transmits at least one output signal of an audio or an image to an output device capable of visually or audibly notifying an occupant of the vehicle or the outside of the vehicle of information. In the example of FIG. 19, an audio speaker 12061, a display unit 12062, and an instrument panel 12063 are illustrated as the output device. The display unit 12062 may include, for example, at least one of an on-board display and a head-up display.

Figure 20:
FIG. 20 is a diagram illustrating an example of an installation position of an imaging unit.

FIG. 20 is a diagram illustrating an example of an installation position of the imaging unit 12031.

In FIG. 20, imaging units 12101, 12102, 12103, 12104, and 12105 are included as the imaging unit 12031.

The imaging units 12101, 12102, 12103, 12104, and 12105 are provided, for example, at positions such as a front nose, a side mirror, a rear bumper, and a back door of a vehicle 12100 and an upper portion of a windshield of a vehicle interior. The imaging unit 12101 provided at the front nose and the imaging unit 12105 provided at the upper portion of the windshield of the vehicle interior mainly acquire the image of the front side of the vehicle 12100. The imaging units 12102 and 12103 provided at the side mirrors mainly acquire the image of the sides of the vehicle 12100. The imaging unit 12104 provided on the rear bumper or the back door mainly acquires the image of the rear side of the vehicle 12100. The imaging unit 12105 provided at the upper portion of the windshield of the vehicle interior is mainly used to detect a preceding vehicle, a pedestrian, an obstacle, a traffic light, a traffic sign, a lane, or the like.

Incidentally, FIG. 20 illustrates an example of imaging ranges of the imaging units 12101 to 12104. An imaging range 12111 indicates an imaging range of the imaging unit 12101 provided at the front nose, imaging ranges 12112 and 12113 indicate imaging ranges of the imaging units 12102 and 12103 provided at the side mirrors, respectively, and an imaging range 12114 indicates an imaging range of the imaging unit 12104 provided at the rear bumper or the back door. For example, by superimposing image data captured by the imaging units 12101 to 12104, an overhead view image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, the microcomputer 12051 obtains a distance to each three-dimensional object in the imaging ranges 12111 to 12114 and a temporal change (a relative speed with respect to the vehicle 12100) of the distance on the basis of the distance information obtained from the imaging units 12101 to 12104, thereby extracting, as a preceding vehicle, a three-dimensional object which is, particularly, the closest to the vehicle 12100 on the traveling path of the vehicle

12100 and travels at a predetermined speed (for example, 0 km/h or more) in substantially the same direction as that of the vehicle 12100. Further, the microcomputer 12051 can set an inter-vehicle distance to be secured in front with respect to the preceding vehicle in advance, and can perform automatic brake control (including follow-up stop control), automatic acceleration control (including follow-up start control), and the like. As described above, it is possible to perform cooperative control for the purpose of automatic driving or the like in which the vehicle autonomously travels without depending on the operation of the driver.

For example, on the basis of the distance information obtained from the imaging units 12101 to 12104, the microcomputer 12051 can classify three-dimensional object data regarding three-dimensional objects into two-wheeled vehicles, ordinary vehicles, large vehicles, pedestrians, and other three-dimensional objects such as utility poles, extract the three-dimensional object data, and use the three-dimensional object data for automatic avoidance of obstacles. For example, the microcomputer 12051 identifies obstacles around the vehicle 12100 as obstacles that can be visually recognized by the driver of the vehicle 12100 and obstacles that are difficult to visually recognize. Then, the microcomputer 12051 determines a collision risk indicating a risk of collision with each obstacle, and when there is a collision possibility of a set value or more in the collision risk, the microcomputer can perform driving assistance for collision avoidance by outputting an alarm to the driver via the audio speaker 12061 or the display unit 12062 or performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not a pedestrian is present in the captured images of the imaging units 12101 to 12104. Such pedestrian recognition is performed by, for example, a procedure of extracting feature points in the captured images of the imaging units 12101 to 12104 as infrared cameras and a procedure of performing a pattern matching process on a series of feature points indicating the outline of an object to determine whether or not the object is a pedestrian. When the microcomputer 12051 determines that a pedestrian is present in the captured images of the imaging units 12101 to 12104 and recognizes the pedestrian, the audio image output unit 12052 controls the display unit 12062 to superimpose and display a square contour line for emphasis on the recognized pedestrian. Further, the audio image output unit 12052 may control the display unit 12062 to display an icon or the like indicating a pedestrian at a desired position.

Hereinbefore, an example of the vehicle control system to which the technique according to the present disclosure can be applied has been described. The technique according to the present disclosure can be applied to the imaging unit 12031 among the configurations described above. Specifically, the distance measuring system 6 in FIG. 4 can be applied to the imaging unit 12031. By applying the technique according to the present disclosure to the imaging unit 12031, the calculation speed of the distance to the obstacle around the vehicle can be improved.

Although the embodiment of the present disclosure has been described above, the technical scope of the present disclosure is not limited to the above-described embodiment as it is, and various modifications may be made without departing from the gist of the present disclosure. Further, the component may be combined suitably over different embodiments and the modification.

The effects described in this specification are merely examples and are not limited, and other effects may be present.

Incidentally, this technique may also be configured as below.

(1)

A device comprising:

a model switching unit that switches a machine learning model used for recognizing information about a distance to a measurement object based on an output signal output from a light receiving element when the light receiving element receives light emitted from a light source and reflected by the measurement object.

(2)

The device according to (1), wherein the model switching unit switches the machine learning model based on the output signal.

(3)

The device according to (1), wherein the model switching unit switches the machine learning model based on a sensing result of a subject space in which the measurement object exists.

(4)

The device according to (3), wherein the sensing result includes information about a type of the measurement object, and wherein the model switching unit switches the machine learning model based on the sensing result.

(5)

The device according to (3) or (4), wherein the sensing result includes information about a scene in the subject space, and wherein the model switching unit switches the machine learning model based on the sensing result.

(6)

The device according to (5), wherein the information about the scene includes at least one of information about a weather, information about a time, and information about a place of the subject space, and wherein the model switching unit switches the machine learning model based on the information about the scene.

(7)

The device according to any one of (1) to (6), further comprising a determination unit that determines a distance measuring point in the subject space based on the sensing result.

(8)

A measuring device comprising:

a light receiving unit including a light receiving element that outputs a signal when the light receiving element receives light emitted from a light source and reflected by a measurement object;

a recognition unit that recognizes information about a distance to the measurement object using a machine learning model based on an output signal of the light receiving unit; and a model switching unit that switches the machine learning model.

(9)

A distance measuring system comprising:

a light source that irradiates a measurement object in a subject space with light;

a sensor unit that senses the subject space;

a light receiving unit including a light receiving element that outputs a signal when the light receiving element receives light emitted from the light source and reflected by the measurement object;

a recognition unit that recognizes a distance to the measurement object using a machine learning model based on an output signal of the light receiving unit; and a model switching unit that switches the machine learning model based on a sensing result by the sensor unit.

(10)

A method comprising:

switching a machine learning model used for recognizing information about a distance to a measurement object based on an output signal output from a light receiving element when the light receiving element receives light emitted from a light source and reflected by the measurement object.

REFERENCE SIGNS LIST

1 MEASURING DEVICE
2 LIGHT SOURCE
4 CONTROL DEVICE
6 DISTANCE MEASURING SYSTEM
8 IMAGING DEVICE
10 PIXEL
100 PIXEL ARRAY UNIT
110 CONVERSION UNIT
111 RECOGNITION UNIT
112 DATA GENERATION UNIT
113 MODEL SWITCHING UNIT
107 MODEL STORAGE UNIT
401 ACQUISITION UNIT
402 EXTRACTION UNIT
403 SCENE RECOGNITION UNIT
404 MODEL SELECTION UNIT
405 NOTIFICATION UNIT
406 DISTANCE MEASUREMENT DETERMINATION UNIT

The invention claimed is:

1. A device, comprising:

a light source configured to emit light toward a measurement object;

a light receiving element configured to:

receive the light reflected from the measurement object; and output an output signal based on the reception of the reflected light; and a central processing unit (CPU) configured to:

convert the output signal into time information, wherein the time information indicates a time range corresponding to a time from the emission of the light by the light source to a time of the reception of the light by the light receiving element;

acquire first distribution of the time information;

change, based on the acquired first distribution of the time information, values of a plurality of parameters of the light source, wherein the plurality of parameters includes at least one of a direction of irradiation by the light source, power of the irradiation by the light source, or a pulse shape of the irradiation by the light source;

acquire second distribution of the time information based on the changed values of the plurality of parameters of the light source;

select, based on the acquired second distribution of the time information, a first machine learning model from a plurality of machine learning models, wherein the selected first machine learning model recognizes specific information corresponding to a distance to the measurement object, and the specific information is recognized based on the time information;

acquire a sensing result of a subject space in which the measurement object exists; and switch, based on the sensing result, from the first machine learning model to a second machine learning model of the plurality of machine learning models.

2. The device according to claim 1, wherein the CPU is further configured to change, based on the acquired first distribution of the time information, a value of a parameter associated with the light receiving element, and the parameter comprises sensitivity of the light receiving element.

3. The device according to claim 1, wherein the sensing result includes first information corresponding to a type of the measurement object.

4. The device according to claim 3, wherein the sensing result further includes second information corresponding to a scene in the subject space.

5. The device according to claim 4, wherein the second information includes at least one of information of a weather in the subject space, information of a time associated with the subject space, or information of a place of the subject space, and the CPU is further configured to switch from the first machine learning model to the second machine learning model based on the second information.

6. The device according to claim 5, wherein the CPU is further configured to determine a distance measuring point in the subject space based on the sensing result.

7. A measuring device, comprising:

a light source configured to emit light toward a measurement object;

a light receiving element configured to:

receive the light reflected from the measurement object; and output an output signal based on the reception of the reflected light; and a central processing unit (CPU) configured to:

convert the output signal into time information, wherein the time information indicates a time range corresponding to a time from the emission of the light by the light source to a time of the reception of the light by the light receiving element;

acquire first distribution of the time information;

change, based on the acquired first distribution of the time information, values of a plurality of parameters associated with the light source, wherein the plurality of parameters includes at least one of a direction of irradiation by the light source, power of the irradiation by the light source, or a pulse shape of the irradiation by the light source;

acquire second distribution of the time information based on the changed values of the plurality of parameters of the light source;

select, based on the acquired second distribution of the time information, a first machine learning model from a plurality of machine learning models;

recognize, based on the selected first machine learning model, specific information corresponding to a distance to the measurement object, wherein the recognition of the specific information corresponding to the distance to the measurement object is based on the time information;

acquire a sensing result of a subject space in which the measurement object exists; and switch, based on the sensing result, from the selected first machine learning model to a second machine learning model of the plurality of machine learning models.

8. A distance measuring system, comprising:

a light source configured to emit light toward a measurement object, wherein the measurement object exists in a subject space;

a light receiving element configured to:

receive the light reflected from the measurement object; and output an output signal based on the reception of the reflected light;

a plurality of sensors configured to sense the subject space; and a central processing unit (CPU) configured to:

convert the output signal into time information, wherein the time information indicates a time range corresponding to a time from the emission of the light by the light source to a time of the reception of the light by the light receiving element;

acquire first distribution of the time information;

change, based on the acquired first distribution of the time information, values of a plurality of parameters of the light source, wherein the plurality of parameters includes at least one of a direction of irradiation by the light source, power of the irradiation by the light source, or a pulse shape of the irradiation by the light source;

acquire second distribution of the time information based on the changed values of the plurality of parameters of the light source;

select, based on the acquired second distribution of the time information, a first machine learning model from a plurality of machine learning models; and recognize, based on the selected first machine learning model, information corresponding to a distance to the measurement object, wherein the recognition of information corresponding to the distance to the measurement object is based on the time information;

acquire, from at least one sensor of the plurality of sensors, a sensing result of the subject space in which the measurement object exists; and switch, based on the sensing result, from the first machine learning model to a second machine learning model of the plurality of machine learning models.

9. A method, comprising:

emitting, by a light source, light toward a measurement object;

receiving, by a light receiving element, the light reflected from the measurement object;

outputting, by the light receiving element, an output signal based on the reception of the reflected light;

converting the output signal into time information, wherein the time information indicates a time range corresponding to a time from the emission of the light by the light source to a time of the reception of the light by the light receiving element;

acquiring first distribution of the time information;

changing, based on the acquired first distribution of the time information, values of a plurality of parameters associated with the light source, wherein the plurality of parameters includes at least one of a
direction of irradiation by the light source, power of
the irradiation by the light source, or a pulse shape of
the irradiation by the light source;

acquiring second distribution of the time information
based on the changed values of the plurality of param-
eters of the light source;

selecting, based on the acquired second distribution of the
time information, a first machine learning model from
a plurality of machine learning models, wherein
the selected first machine learning model recognizes
specific information corresponding to a distance to
the measurement object, and
the specific information is recognized based on the time
information;

acquiring a sensing result of a subject space in which the
measurement object exists; and switching, based on the sensing result, from the first
machine learning model to a second machine learning
model of the plurality of machine learning models.

* * * * *